(12) United States Patent
Kaneko

(10) Patent No.: US 12,518,793 B2
(45) Date of Patent: *Jan. 6, 2026

(54) MAGNETIC TAPE, MAGNETIC TAPE CARTRIDGE, AND MAGNETIC TAPE DEVICE

(71) Applicant: FUJIFILM Corporation, Tokyo (JP)

(72) Inventor: Tetsuya Kaneko, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/779,225

(22) Filed: Jul. 22, 2024

(65) Prior Publication Data

US 2024/0379126 A1 Nov. 14, 2024

Related U.S. Application Data

(63) Continuation of application No. 18/191,354, filed on Mar. 28, 2023, now Pat. No. 12,080,322, which is a
(Continued)

(30) Foreign Application Priority Data

Sep. 30, 2020 (JP) ................................ 2020-165818

(51) Int. Cl.
| | | |
|---|---|---|
| *G11B 23/107* | (2006.01) | |
| *G11B 5/588* | (2006.01) | |
| *G11B 5/78* | (2006.01) | |

(52) U.S. Cl.
CPC ............ *G11B 23/107* (2013.01); *G11B 5/588* (2013.01); *G11B 5/78* (2013.01)

(58) Field of Classification Search
None
See application file for complete search history.

(56) References Cited

U.S. PATENT DOCUMENTS 5,625,508 A * 4/1997 Brown ............... G11B 5/59616
6,169,640 B1 * 1/2001 Fasen ..................... G11B 5/584
(Continued)

FOREIGN PATENT DOCUMENTS

| JP | 6733794 B1 | 8/2020 |
| JP | 2020-140744 A | 9/2020 |
(Continued)

OTHER PUBLICATIONS

International Preliminary Report on Patentability dated Mar. 28, 2023 with a Translation of the Written Opinion of the International Searching Authority in Application No. PCT/JP2021/034153.
(Continued)

*Primary Examiner* — Peter Vincent Agustin
(74) *Attorney, Agent, or Firm* — Sughrue Mion, PLLC

(57) ABSTRACT

A magnetic tape including a timing-based servo pattern, in which the magnetic tape is used in a magnetic tape device in which a total number of data tracks is 8705 or more in conversion of a magnetic tape having a width of ½ inches, and αPNL of the timing-based servo pattern is 10.0% or less of a track pitch. A magnetic tape cartridge including the magnetic tape, and a magnetic tape device including a magnetic tape, in which a total number of data tracks is 8705 or more in conversion of a magnetic tape having a width of ½ inches, the magnetic tape includes a timing-based servo pattern, and αPNL of the timing-based servo pattern is 10.0% or less of a track pitch are provided. The αPNL indicates an amount of deviation of the timing-based servo pattern from linearity.

17 Claims, 7 Drawing Sheets

Related U.S. Application Data continuation of application No. PCT/JP2021/034153, filed on Sep. 16, 2021.

(56) References Cited

U.S. PATENT DOCUMENTS

| | | | | |
|---|---|---|---|---|
| 6,198,584 | B1* | 3/2001 | Codilian | G11B 5/59655 |
| | | | | 360/75 |
| 10,366,716 | B1 | 7/2019 | Judd et al. | |
| 12,080,322 | B2* | 9/2024 | Kaneko | G11B 5/78 |
| 2004/0252394 | A1* | 12/2004 | Hamaguchi | G11B 5/59655 |
| | | | | 360/48 |
| 2007/0171565 | A1* | 7/2007 | Cherubini | G11B 5/584 |
| 2008/0100952 | A1* | 5/2008 | Trabert | G11B 5/584 |
| 2020/0035266 | A1* | 1/2020 | Judd | G11B 5/00817 |
| 2020/0273489 | A1 | 8/2020 | Kaneko et al. | |
| 2020/0273490 | A1 | 8/2020 | Naoi | |
| 2021/0065741 | A1* | 3/2021 | Nakao | G11B 5/265 |
| 2021/0407540 | A1 | 12/2021 | Sekiguchi et al. | |
| 2023/0238032 | A1* | 7/2023 | Kaneko | G11B 23/107 |
| | | | | 360/77.12 |
| 2024/0379126 | A1* | 11/2024 | Kaneko | G11B 23/107 |

FOREIGN PATENT DOCUMENTS

| | | |
|---|---|---|
| JP | 2020-140746 A | 9/2020 |
| JP | 6750740 B2 | 9/2020 |

OTHER PUBLICATIONS

International Search Report issued Dec. 7, 2021 in International Application No. PCT/JP2021/034153.
Written Opinion issued Dec. 7, 2021 in International Application No. PCT/JP2021/034153.

\* cited by examiner

MAGNETIC TAPE, MAGNETIC TAPE CARTRIDGE, AND MAGNETIC TAPE DEVICE

CROSS-REFERENCE TO RELATED APPLICATIONS

This application is a Continuation of application Ser. No. 18/191,354 filed Mar. 28, 2023, which is a Continuation of PCT International Application No. PCT/JP2021/034153 filed on Sep. 16, 2021, which claims priority under 35 U.S.C. § 119(a) to Japanese Patent Application No. 2020-165818 filed on Sep. 30, 2020. Each of the above applications is hereby expressly incorporated by reference, in its entirety, into the present application.

BACKGROUND OF THE INVENTION

1. Field of the Invention

The present invention relates to a magnetic tape, a magnetic tape cartridge, and a magnetic tape device.

2. Description of the Related Art

In recent years, a tape-shaped magnetic recording medium (that is, a magnetic tape) is mainly used for a data storage such as back-up, archive, or the like. An increase in recording capacity (high capacity) of the magnetic tape is required in accordance with a great increase in information content in recent years. As a unit for realizing high capacity, a technology of disposing a larger amount of data tracks on a magnetic layer by narrowing a width of the data track to increase recording density is used.

However, in a case where the width of the data track is narrowed and a larger number of data tracks are disposed on the magnetic layer, and it is difficult that a magnetic head correctly follows the data tracks in a case where the recording and/or reproducing of data is performed by allowing the running of the magnetic tape in a magnetic tape device, and errors may easily occur in a case of recording and/or reproducing. Thus, as a unit for reducing occurrence of such errors, a system of performing head tracking using a servo signal (hereinafter, referred to as a "servo system") has been recently proposed and practically used (for example, see U.S. Ser. No. 10/366,716A).

SUMMARY OF THE INVENTION

In a magnetic servo type servo system among the servo systems, a servo pattern is formed on a magnetic layer of a magnetic tape, and this servo pattern is magnetically read to perform head tracking. More specific description is as follows.

First, a servo head reads a servo pattern formed on a magnetic layer by a servo pattern reading element included in a magnetic head. Next, a position of the magnetic head in a width direction of the magnetic tape is controlled in accordance with a reading result of the servo pattern, and accordingly, the magnetic head is allowed to follow a data track. Accordingly, in a case of allowing the magnetic tape to run in the magnetic tape device for recording or reproducing data on the magnetic tape, it is possible to increase an accuracy for allowing the magnetic head to follow the data track, even in a case where the position of the magnetic tape is changed in the width direction with respect to the magnetic head. By doing so, it is possible to correctly record data on the magnetic tape and/or correctly reproduce data recorded on the magnetic tape.

In recent years, a timing-based servo system has been widely used as the magnetic servo type servo system. In a timing-based servo type servo system (hereinafter, also referred to as a "timing-based servo system"), a plurality of servo patterns having two or more different shapes are formed on a servo band, and the position of the magnetic head is recognized by a time interval at which the servo pattern reading element has read two servo patterns having different shapes and a time interval at which the servo pattern reading element has read two servo patterns having the same shape. The position of the magnetic head in the width direction of the magnetic tape is controlled based on the position recognized in this way.

Regarding the timing-based servo system, Patent Document 1 (U.S. Ser. No. 10/366,716A) discloses a method for evaluating a nonlinearity of a servo pattern of a timing-based servo (see claim 1 or the like of U.S. Ser. No. 10/366,716A).

In the timing-based servo system, head tracking is performed on the premise that the servo pattern formed on the magnetic layer has a perfect linearity. However, in practice, it is not easy to form the servo pattern having the perfect linearity on the magnetic layer. In this regard, Patent Document 1 (U.S. Ser. No. 10/366,716A) merely discloses that the nonlinearity of the servo pattern is evaluated. However, the head tracking performed on the premise that the servo pattern has the perfect linearity even though the servo pattern having nonlinearity is actually formed on the magnetic layer causes a decrease in the accuracy of the head tracking. As a result, an error easily occurs during the recording and reproducing and recording and reproducing quality may be deteriorated. In addition, unless otherwise specified, the "recording and reproducing" in the present specification refers to "recording only", "reproducing only", or "recording and reproducing".

In view of the above circumstances, an aspect of the present invention is to improve recording and reproducing quality of a magnetic tape device using a timing-based servo system.

According to one aspect of the invention, there is provided a magnetic tape comprising: a timing-based servo pattern, in which the magnetic tape is used in a magnetic tape device in which a total number of data tracks is 8705 or more in conversion of a magnetic tape having a width of ½ inches, αPNL of the timing-based servo pattern is 10.0% or less of a track pitch, and the αPNL indicates an amount of deviation of the timing-based servo pattern from linearity.

According to another aspect of the invention, there is provided a magnetic tape device comprising: a magnetic tape, in which a total number of data tracks is 8705 or more in conversion of a magnetic tape having a width of ½ inches, the magnetic tape includes a timing-based servo pattern, αPNL of the timing-based servo pattern is 10.0% or less of a track pitch, and the αPNL indicates an amount of deviation of the timing-based servo pattern from linearity.

In one embodiment, the total number of data tracks may be 8960 or more.

In one embodiment, the αPNL of the timing-based servo pattern may be 0.5% to 10.0% of the track pitch.

In one embodiment, the magnetic tape may include a non-magnetic support, and a magnetic layer containing a ferromagnetic powder.

In one embodiment, the magnetic tape may further include a non-magnetic layer containing a non-magnetic powder between the non-magnetic support and the magnetic layer.

In one embodiment, the magnetic tape may include a back coating layer containing a non-magnetic powder on a surface side of the non-magnetic support opposite to a surface side including the magnetic layer.

According to still another aspect of the invention, there is provided a magnetic tape cartridge comprising the magnetic tape described above.

According to one aspect of the present invention, it is possible to improve the recording and reproducing quality of the magnetic tape device using the timing-based servo system.

DESCRIPTION OF THE PREFERRED EMBODIMENTS

[Magnetic Tape and Magnetic Tape Device]

Figure 1:
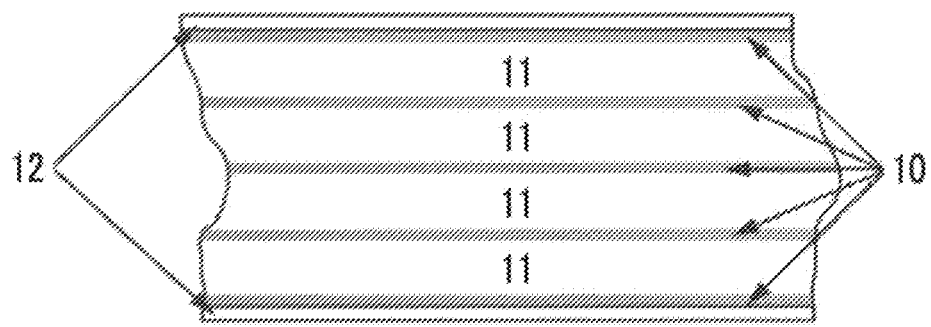
FIG. 1 shows an example of disposition of data bands and servo bands of a magnetic tape.

One aspect relates to a magnetic tape including a timing-based servo pattern, in which the magnetic tape is used in a magnetic tape device in which a total number of data tracks is 8705 or more in conversion of a magnetic tape having a width of ½ inches, and αPNL of the timing-based servo pattern is 10.0% or less of a track pitch. The αPNL indicates an amount of deviation of the timing-based servo pattern from linearity.

In addition, one aspect of the present invention relates to a magnetic tape device including a magnetic tape, in which a total number of data tracks is 8705 or more in conversion of a magnetic tape having a width of ½ inches, the magnetic tape includes a timing-based servo pattern, and αPNL of the timing-based servo pattern is 10.0% or less of a track pitch.

Hereinafter, the magnetic tape and the magnetic tape device will be described more specifically.

<Total Number of Data Tracks>

The total number of data tracks in conversion of a magnetic tape having a width of ½ inches in data recording on the magnetic tape is 8705 or more. As a result of intensive studies of the present inventors, it was found that, in a case where a large number of data tracks, which are 8705 or more data tracks in total, are provided in the magnetic tape by narrowing the tracks, it is possible to improve the recording and reproducing quality by setting the αPNL to be 10.0% or less of the track pitch. This point has not been suggested in Patent Document 1 (U.S. Ser. No. 10/366,716A) that merely discloses evaluation of nonlinearity of a servo pattern of a timing-based servo, and is newly found by the present inventors.

In the present invention and the present specification, the "total number of data tracks" is a value calculated by the following equation.

Total number of data tracks=number of data bands×
number of wraps in 1 data band×number of
recording elements The "number of recording elements" described above is the number of recording elements included in a magnetic head that records data. In a general magnetic head, a pair of one recording element and one reproducing element is referred to as a channel, and the number of recording elements is the same value as the number of channels. In addition, the "number of wraps in 1 data band" is the number of track sets read in an end-to-end pass in one direction (single, one-way, end-to-end pass). In the industry standard, the number of data bands is generally expressed as "number of data bands", the number of wraps in 1 data band is expressed as "number of wraps in 1 data band (DB)", and the number of channels is expressed as "number of channels". These values are determined for each magnetic tape system by industry standards and the like, and once the magnetic tape system to which the magnetic tape is applied is determined, the values are naturally determined as unique values of such a magnetic tape system.

The "total number of data tracks" in the present invention and the present specification is a value in conversion of the magnetic tape having a width of ½ inches. As a value of the width of the magnetic tape, a width determined for the magnetic tape according to a standard such as Linear Tape-Open (LTO) can be adopted. For example, for a standard magnetic tape that uses the magnetic tape having a width of ½ inches, ½ inches can be adopted as the value of the width of the magnetic tape. For magnetic tape having the width other than ½ inches, a value calculated by dividing the total number of data tracks of the magnetic tape by a value of a tape width (unit: inch) of the magnetic tape×2 is set as the total number of data tracks in conversion of the magnetic tape having a width of ½ inches. ½ inches=12.65 mm.

The total number of data tracks in the data recording on the magnetic tape is 8705 or more and preferably 8960 or more. In addition, the total number of data tracks can be, for example, 35840 or less. Since a large total number of data tracks is preferable from a viewpoint of high capacity, the total number of data tracks of the magnetic tape may exceed the values exemplified above.

<Timing-Based Servo Pattern>

The magnetic tape includes a timing-based servo pattern. Specifically, the magnetic tape can include a magnetic layer on which the timing-based servo pattern is formed. As described above, in the timing-based servo system, a plurality of servo patterns having two or more different shapes are formed on a magnetic layer, and a position of the magnetic head is recognized by a time interval at which a servo pattern reading element included in the magnetic head has read two servo patterns having different shapes and a time interval at which the servo pattern reading element has read two servo patterns having the same shape. The "timing-based servo pattern" of the invention and the specification refers to a servo pattern that enables head tracking in the timing-based servo system. The servo pattern capable of head tracking in the timing-based servo system can be formed on the magnetic layer as a plurality of servo patterns having two or more different shapes by a servo write head, which is a head for forming the servo pattern. In an example, the plurality of servo patterns having two or more different shapes are continuously disposed at regular intervals for each of the plurality of servo patterns having the same shapes. In another example, different types of the servo patterns are alternately disposed. For the servo pattern having the same shapes, a difference in the shape to the extent that can normally occur in the formation of the servo pattern is not considered. The shape of the servo pattern capable of head tracking in the timing-based servo system and the disposition thereof on the servo band are well known, and specific aspects thereof will be described later. Hereinafter, the "timing-based servo pattern" is also simply referred to as a "servo pattern".

Figure 2:
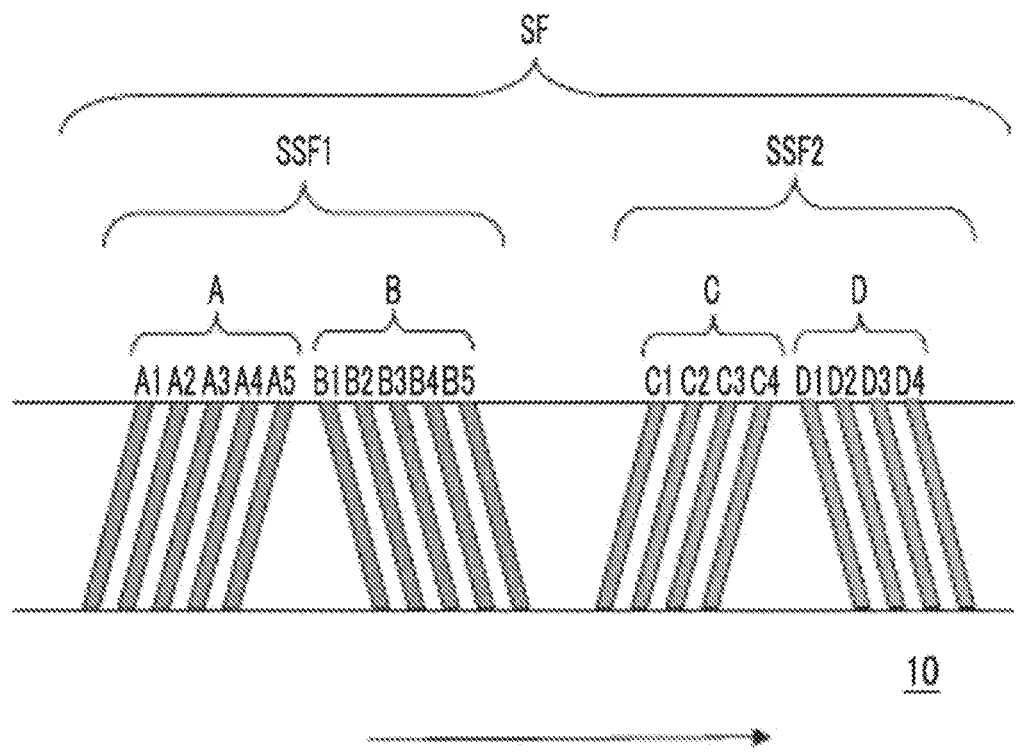
FIG. 2 shows a servo pattern disposition example of a linear tape-open (LTO) Ultrium format tape.

For example, in a linear recording system which is widely used at the current stage, the timing-based servo system is generally adopted. In the magnetic tape applied to such a system, a plurality of regions (referred to as "servo bands") in which a servo pattern is formed are usually present on the magnetic layer along a longitudinal direction of the magnetic tape. A region interposed between two servo bands is called a data band. Data (magnetic signal) recording is performed on data bands, and a plurality of data tracks are formed on each data band along the longitudinal direction. FIG. 1 shows an example of disposition of data bands and servo bands. In FIG. 1, a plurality of servo bands 10 are disposed to be interposed between guard bands 12 in a magnetic layer of a magnetic tape 1. A plurality of regions 11 each of which is interposed between two servo bands are data bands. The servo pattern is a magnetized region and is formed by magnetizing a specific region of the magnetic layer by a servo write head. The region magnetized by the servo write head (position where a servo pattern is formed) is determined by standards. For example, in a linear tape-open (LTO) Ultrium format tape which is based on a local standard, a plurality of servo patterns tilted in a tape width direction as shown in FIG. 2 are formed on a servo band, in a case of manufacturing a magnetic tape. Specifically, in FIG. 2, a servo frame SF on the servo band 10 is configured with a servo sub-frame 1 (SSF1) and a servo sub-frame 2 (SSF2). The servo sub-frame 1 is configured with an A burst (in FIG. 2, reference numeral A) and a B burst (in FIG. 2, reference numeral B). The A burst is configured with servo patterns A1 to A5 and the B burst is configured with servo patterns B1 to B5. Meanwhile, the servo sub-frame 2 is configured with a C burst (in FIG. 2, reference numeral C) and a D burst (in FIG. 2, reference numeral D). The C burst is configured with servo patterns C1 to C4 and the D burst is configured with servo patterns D1 to D4. Such 18 servo patterns are disposed in the sub-frames in the arrangement of 5, 5, 4, 4, as the sets of 5 servo patterns and 4 servo patterns, and are used for recognizing the servo frames. FIG. 2 shows one servo frame. However, in each servo band, a plurality of servo frames are disposed in a running direction. In FIG. 2, an arrow shows the running direction of the magnetic tape. A proceeding side (a right side in FIG. 2) of the running direction of the magnetic tape shown with the arrow is a downstream side and an opposite side thereto (a left side in FIG. 2) is an upstream side.

Figure 3:
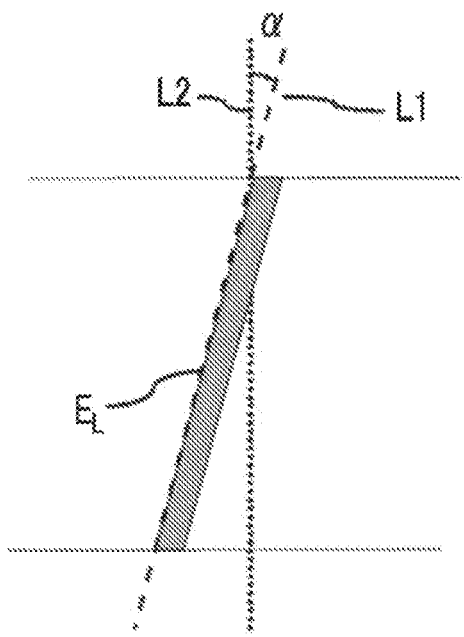
FIG. 3 is an explanatory diagram of an azimuth angle α.
Figure 4:
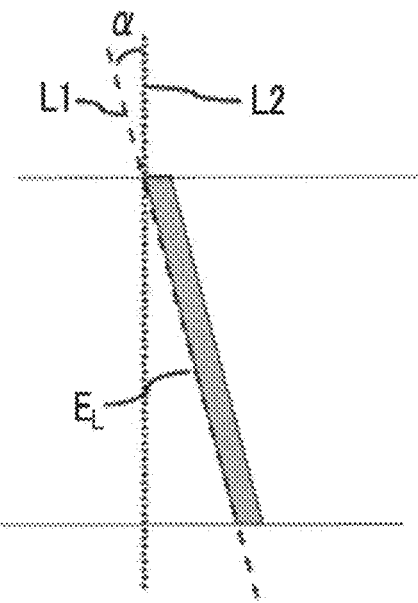
FIG. 4 is an explanatory diagram of an azimuth angle α.

FIGS. 3 and 4 are explanatory views of an azimuth angle $\alpha$. In the servo pattern shown in FIG. 2, for servo patterns tilted toward the downstream side in the running direction, such as the servo patterns A1 to A5 and C1 to C4, an angle formed by a line segment (a broken line L1 in FIG. 3) connecting two end parts of an edge $E_L$ on the upstream side and a tape width direction (a broken line L2 in FIG. 3) is the azimuth angle $\alpha$. On the other hand, for servo patterns tilted toward the upstream side in the running direction, such as the servo patterns B1 to B5 and D1 to D4, an angle formed by a line segment (a line segment L1 in FIG. 4) connecting two end parts of an edge $E_L$ on the upstream side and the tape width direction (a line segment L2 in FIG. 4) is the azimuth angle $\alpha$.

The azimuth angle $\alpha$ of the timing-based servo pattern included in the magnetic tape can be, for example, 370 or less, 300 or less, or 25° or less. In addition, the azimuth angle $\alpha$ can be, for example, 5° or more or 10° or more. In a case where a larger number of data tracks are disposed on the magnetic layer to increase the recording density, it is preferable that the azimuth angle $\alpha$ is large in order to perform the head tracking in the timing-based servo system.

As the values regarding the shape of the servo pattern, a "pattern height", a "midpoint distance", a "sub-frame length", and the like can be used, in addition to the azimuth angle. The "pattern height" has the same meaning as a servo pattern length in the width direction of the magnetic tape. The "midpoint distance" refers to a distance (a distance in the longitudinal direction) at a midpoint position of a pattern height between adjacent bursts in one sub-frame, and can be a distance (a distance in the longitudinal direction) at a midpoint position of a pattern height from an upstream side edge of an uppermost stream side servo pattern of an uppermost stream side burst in a servo sub-frame disposed on an uppermost stream side to an upstream side edge of an uppermost stream side servo pattern in an adjacent burst. For example, in the servo frame SF shown in FIG. 2, the distance (the distance in the longitudinal direction of the magnetic tape) at the midpoint position of the pattern height between an upstream side edge of the servo pattern A1 and an upstream side edge of the servo pattern B1 can be used as the midpoint distance. In the examples which will be described later, such a distance was adopted as the midpoint distance. The "sub-frame length" refers to a distance (a distance in the longitudinal direction) between upper ends or the lower ends of upstream side edges of adjacent servo sub-frames in one servo frame, and can be a distance (a distance in the longitudinal direction) between upper ends or lower ends of an upstream side edge of an uppermost stream side servo pattern of a servo sub-frame disposed on an uppermost stream side and an upstream side edge of an uppermost stream side servo pattern of an adjacent servo sub-frame. For example, in the servo frame SF shown in FIG. 2, a distance (a distance in the longitudinal direction) between upper ends or lower ends of an upstream side edge of the servo pattern A1 and an upstream side edge of the servo pattern C1 can be used as the sub-frame length. In the examples which will be described later, such a distance was adopted as the sub-frame length. The pattern height can be, for example, 40 μm or more or 45 μm or more, and 120 μm or less or 100 μm or less. The midpoint distance can be, for example, 20 μm or more or 25 μm or more, and 45 μm or less or 40 μm or less. The sub-frame length can be, for example, 45 μm or more or 50 μm or more, and can be 85 μm or less or 80 μm or less.

Regarding the servo pattern included in the magnetic tape, the measurement of the various values described above regarding the shape of the servo pattern is performed on one servo frame randomly specified among a plurality of servo frames included in the magnetic tape to be measured. In the magnetic tape to be measured, one randomly specified servo frame is magnetically developed. The magnetic development can be performed using, for example, a colloidal solution for observing a magnetic pattern (for example, Sigmarker Q manufactured by Sigma High Chemical Inc.).

The various values described above regarding the shape of the magnetically developed servo pattern can be obtained by measuring a length with a microscope having a length measuring function in an X/Y direction (for example, MM-800 manufactured by Nikon Corporation). Here, it is desirable that a minimum resolution of the length measurement is 1 μm or less. It is assumed that the number of times of measurements for obtaining each value is 5 and each of the above values is obtained as an arithmetic average of the values obtained by the 5 measurements.

Figure 5:
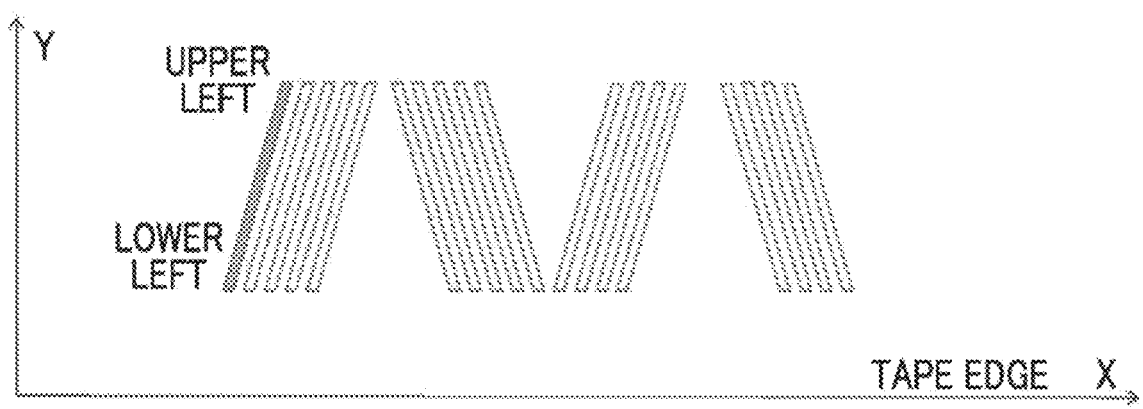
FIG. 5 is an explanatory diagram of a method for measuring a value regarding a shape of a servo pattern.

FIG. 5 is an explanatory diagram of a method for measuring a value regarding a shape of a servo pattern. FIG. 5 shows a servo frame in which servo patterns are disposed as shown in FIG. 2.

In a case of describing the "azimuth angle α" using the servo pattern A1 which is the servo pattern tilted toward the downstream side in the running direction as shown in FIG. 3 as an example, the azimuth angle α can be calculated by measuring xy coordinates of lower left and upper left (can also be lower right and upper right) edges of the servo pattern, setting a tape edge as 0° as a reference, and using an arctangent. Also for the servo pattern tilted toward the upstream side in the running direction as shown in FIG. 4, the azimuth angle α can be obtained in the same manner.

The "pattern height" can be obtained by calculating a difference between the y coordinates of the xy coordinates of the lower left and upper left (can also be lower right and upper right) edges of the servo pattern obtained above.

The "sub-frame length" can be calculated by obtaining a difference between an x coordinate of a lower left (can also be upper left, lower right, or upper right) edge of the servo pattern A1 which is a first servo pattern of the A burst and an x coordinate of a lower left (the same applies) of a first servo pattern of the C burst.

The "midpoint distance" can be calculated as a difference between an x coordinate at a midpoint position of a pattern height of an upstream side edge of the servo pattern A1 which is the first servo pattern of the A burst and an x coordinate at a midpoint position of a pattern height of the upstream side edge of the servo pattern B1 which is the first servo pattern of the B burst.

<Track Pitch>

The track pitch refers to a physical distance in the width direction of the magnetic tape between adjacent data tracks. The track pitch is obtained for the data track formed by recording with the total number of data tracks described above. The track pitch is obtained by the following method.

On a surface of the magnetic layer of the magnetic tape to be measured, a randomly selected region (size: 90 μm×90 μm) is observed with a magnetic force microscope (MFM), and for adjacent data tracks of a portion randomly selected from this region, a distance between tracks in the width direction of the magnetic tape is measured. The distance between tracks of the adjacent data tracks can be obtained as, for example, a distance between a lower end of one data track and a lower end of the other data track in the width direction of the magnetic tape or a distance between an upper end of one data track and an upper end of the other data track. The terms "lower" and "upper" described here are relative terms, and any direction can be defined as "lower" and the opposite direction can be defined as "upper". As the magnetic force microscope, a commercially available magnetic force microscope or a magnetic force microscope having a well-known configuration can be used. The magnetic force microscope is used in a frequency modulation (FM) mode. As a probe of the magnetic force microscope, for example, SSS-MFMR (nominal curvature radius of 15 nm) manufactured by Nanoworld Ltd. can be used. A measurement pitch during the observation with the magnetic force microscope is in a range of 10 to 100 nm, and a distance between the surface of the magnetic layer and a distal end of the probe is in a range of 20 to 50 nm.

The operation described above is performed in each of the five randomly selected regions, and an arithmetic average of the obtained values is set as the track pitch.

As described above, the total number of data tracks is a value calculated from the number of data bands determined for each magnetic tape system by the industry standards or the like, the number of wraps in 1 data band, and the number of recording elements, and once the magnetic tape system to which the magnetic tape is applied is determined, the value is determined as unique values of such a magnetic tape system. A standard name given when the magnetic tape is put on the market is used as a standard of the magnetic tape system to which the magnetic tape is applied. The magnetic tape is usually marketed in the form of a magnetic tape cartridge (also referred to as a data cartridge). In an example, in a case where a product is commercially available as an "LTO Ultram 8 data cartridge", the magnetic tape in the magnetic tape cartridge is a magnetic tape applied to a magnetic tape system of "LTO Ultraium 8" which is one of the industry standards.

The track pitch can be, for example, 0.10 μm or more or 0.15 μm or more, and can be 2.00 μm or less, 1.50 μm or less, or 1.20 μm or less. However, the track pitch is a value determined by the standard of the magnetic tape system as described above, and is not limited to the range exemplified above.

<αPNL>

In the timing-based servo system, a plurality of servo patterns having two or more different shapes are formed on a magnetic layer, and a position of the magnetic head including the servo pattern reading element is recognized by a time interval at which a servo pattern reading element has read two servo patterns having different shapes and a time interval at which the servo pattern reading element has read two servo patterns having the same shape. In the example shown in FIG. 2, A1 to A5 and C1 to C4 are servo patterns having the same shape, and B1 to B5 and D1 to D4 are servo patterns having the same shape. The former servo patterns and the latter servo patterns are servo patterns having different shapes. In the timing-based servo system, the reading of the distance between two servo patterns is performed by measuring the time interval between a time when one servo pattern is read and a time when the other servo pattern is read, without relying on physical measurement. In a case where the servo pattern is formed with the perfect linearity, the track pitch, which is a physical distance as described above, is proportional to the time interval described above. However, in practice, the servo pattern usually has nonlinearity. As an example of a servo pattern having the nonlinearity, a servo pattern including a curve at an edge as shown in FIG. 10A and FIG. 10B of Patent Document 1 (U.S. Ser. No. 10/366,716A) can be used. In a case where the position of the magnetic head is recognized based on the reading result of the servo pattern having the nonlinearity, the accuracy of causing the magnetic head to follow the data track is decreased in the head tracking based on information on the recognized position. This is considered to be a reason for deteriorating the recording and reproducing quality. In contrast, as a result of intensive studies, the present inventors have newly found that, in the magnetic tape device in which the total number of data tracks in conversion of the magnetic tape having a width of ½ inches is 8705 or more, the controlling of the αPNL, which is a value that can be an indicator of the nonlinearity of the servo pattern, with respect to the track pitch and setting the track pitch as 10.0% or less leads to the improvement of the recording and reproducing quality.

The timing-based servo pattern is usually a linear servo pattern tilted at an angle α (a is the azimuth angle) with respect to the width direction of the magnetic tape, and can be a servo pattern continuous extending from one side to the other side in the width direction of the magnetic tape. The term "linear" with respect to the linear servo pattern means that a pattern shape does not include a curved portion, and it does not matter it does not matter if αPNL has nonlinearity that can be an index. The "continuous" means extending from one side to the other side in the tape width direction without any bending point of an inclined angle and any break. An example of the servo pattern that continuously extends from one side to the other side in the width directions of the magnetic tape is the servo pattern shown in FIG. 2.

In the present invention and the present specification, the "PNL" is used as an abbreviation for "pattern nonlinearity". The "αPNL" indicates a deviation amount from the linearity of the servo pattern and is a value that can be an indicator of a degree of deviation from the linearity, and accordingly, a reference numeral showing the deviation, delta (Δ) is added to PNL to be written as "αPNL". The αPNL is a value obtained by the following method.

Figure 6A:
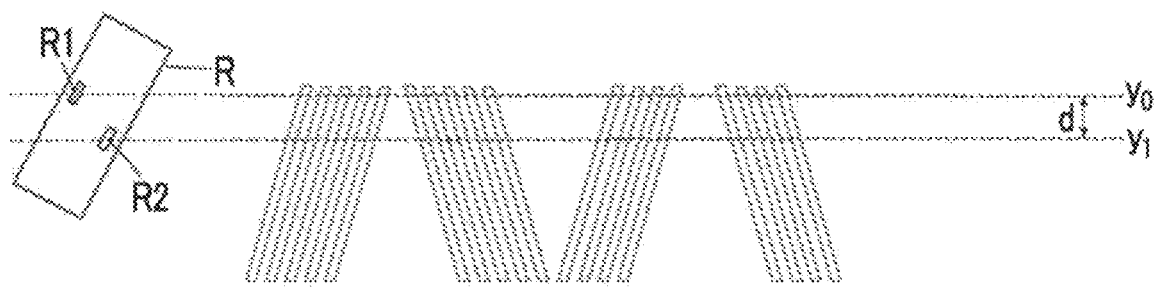
FIG. 6A is an explanatory diagram of a method for measuring αPNL.
Figure 6B:
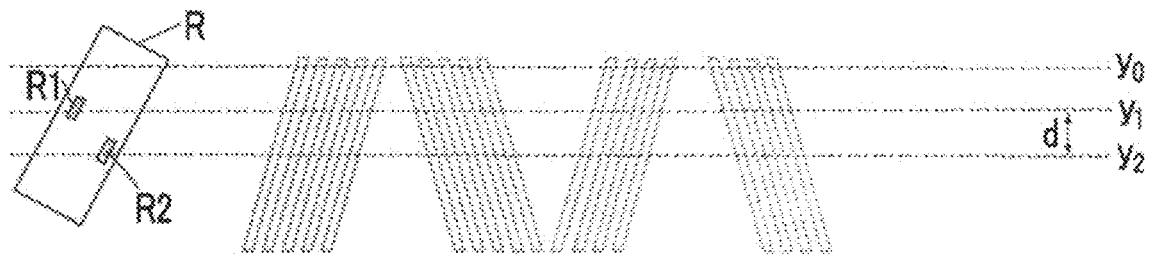
FIG. 6B is an explanatory diagram of a method for measuring αPNL.

FIGS. 6A and 6B are explanatory diagrams of the method for measuring the αPNL.

Hereinafter, FIGS. 6A and 6B are collectively referred to as FIG. 6. In FIG. 6, R represents a reading head, R1 represents a first reading element, and R2 represents a second reading element. A servo pattern in FIG. 6 is the servo pattern shown in the example of FIG. 2. Each part in FIG. 6 is shown as an example, and dimensions and the like are not limited to the aspect shown in the drawing. The same also applies to other drawings. The two reading elements R1 and R2 included in the reading head R can be a reading element having a commercially available or well-known configuration capable of reading a servo pattern. As the reading element, a Giant Magnetoresistive (GMR) element or a Tunnel Magnetoresistive (TMR) element are preferable and the TMR element is more preferable. In addition, an element width thereof is preferably 2 m or less. The element width is a physical dimension of the element width, and can be observed and measured with an optical microscope, a scanning electron microscope, or the like.

In the reading head R, the two reading elements R1 and R2 are disposed at a distance d in the width direction of the magnetic tape. In the reading described below, R1 and R2 perform the reading in a state where the distance d is maintained. The distance d is set as the same value as the track pitch. The track pitch is as described above.

The first reading element starts the reading from a $y_0$ position at a position in the width direction and the second reading element starts the reading from a $y_1$ position (FIG. 6A). In all servo bands included in the magnetic tape, for which the αPNL is obtained, the reading head R performs the reading of a servo pattern at the $y_0$ position by the first reading element R1 and performs the reading of a servo pattern at the $y_1$ position by the second reading element R2 by using the reading head R. By such reading, the time interval between the servo patterns having different shapes and the time interval between the servo patterns having the same shape are obtained. In the example shown in FIG. 2, the time interval for the servo patterns having different shapes is the time interval between A1 and B1, A2 and B2, A3 and B3, A4 and B4, A5 and B5, C1 and D1, C2 and D2, C3 and D3, and C4 and D4. In the example shown in FIG. 2, the time interval between the servo patterns having the same shape is the time interval between A1 and C1, A2 and C2, A3 and C3, A4 and C4, B1 and D1, B2 and D2, B3 and D3, and B4 and D4. In addition, in another example, there may be a case where one servo frame includes A to F bursts, an A burst, a C burst, a D burst, and an F burst include servo patterns having the same shape, a B burst and an E burst include servo patterns having the same shape, the former are servo patterns inclined toward the downstream side in the running direction, the latter are servo patterns inclined toward the upstream side in the running direction, and 27 servo patterns are arranged in the arrangement of 5 (A1 to A5), 5 (B1 to B5), 5 (C1 to C5), 4 (D1 to D4), 4 (E1 to E4), and 4 (F1 to F4) from the upstream side toward the downstream side. In this case, the A burst and the B burst form a sub-frame, and the adjacent sub-frames are formed of the C burst to the F burst. In such an example, the time interval between the servo patterns having different shapes is the time interval between A1 and B1, A2 and B2, A3 and B3, A4 and B4, A5 and B5, D1 and E1, D2 and E2, D3 and E3, and D4 and E4. The time interval between the servo patterns having the same shape is the time interval between A1 and C1, A2 and C2, A3 and C3, A4 and C4, A5 and C5, D1 and F1, D2 and F2, D3 and F3, and D4 and F4.

An arithmetic average of all the measured values of the time intervals obtained for the servo patterns having different shapes is expressed as Td, and an arithmetic average of all the measured values of the time intervals obtained for the servo patterns of the same shape is expressed as Ts. In addition, "(1) 0" is added to a value obtained by the reading by the first reading element at the $y_0$ position. For example, the Td obtained by the reading by the first reading element at the $y_0$ position is expressed as "Td(1)0", and the Ts obtained by the reading by the first reading element at the $y_0$ position is "Td(1)0". The Td obtained by the reading by the second reading element at the $y_1$ position is expressed as "Td(2)1", and the Ts obtained by the reading by the second reading element at the $y_1$ position is expressed as "Ts(2)1". In addition, an actually measured value at the y position obtained from a result obtained by the reading by the first reading element R1 at the $y_0$ position is expressed as "Y(1)0", and an actually measured value at the y position obtained from a result obtained by the reading by the second reading element R2 at the $y_1$ position is expressed as "Y(2)1". The same expression is applied to a reading result at each measurement position described below.

The measured value Y(1)0 at the y position is calculated by the following equation. The method for measuring the sub-frame length and the azimuth angle α is as described above.

$$Y(1)0 = \text{sub-frame length} \times \{1-(Td(1)0/Ts(1)0)\}/2\tan\alpha$$

The measured value Y(2)1 at the y position is calculated by the following equation.

$$Y(2)1 = \text{sub-frame length} \times \{1-(Td(2)1/Ts(2)1)\}/2\tan\alpha$$

The reading is performed by disposing the first reading element R1 at the $y_0$ position and disposing the second reading element R2 at the $y_1$ position, and the reading is performed in the same manner by disposing the first reading element R1 at the $y_1$ position and disposing the second reading element R2 at the $y_2$ position (FIG. 6B). The $y_2$ position is a position separated from the $y_1$ position by the distance d. The reading is sequentially performed as described above, and the second reading element R2 performs the reading at a $y_E$ position which is a final position. A final reading position of the first reading element is a $y_{(E-1)}$ position. E is preferably a value which is the same as the number of wraps in 1 data band, and can be, for example, in a range of 32 to 102.

In a case where a number of the y position is expressed as n, $y_0$ position is expressed as n=0, $y_1$ position is expressed as n=1, and y2 position is expressed as n=2. In a case where the servo pattern is formed on the magnetic tape with the perfect linearity, a difference "$Y(2)_n-Y(1)_{(n-1)}$" between an actually measured value "$Y(2)_n$" at a $y_n$ position obtained from the reading result of the second reading element R2 and an actually measured value "$Y(1)_{(n-1)}$" at a $Y_{(n-1)}$ position obtained from the reading result of the first reading element R1 should be the same value as the distance d, that is, the track pitch. In addition, a difference "$Y(2)_{(n-1)}-Y(1)_{(n-2)}$" between an actually measured value "$Y(2)_{(n-1)}$" at a $y_{(n-1)}$ position obtained from the reading result of the second reading element R2 and an actually measured value "$Y(1)_{(n-2)}$" at a $Y_{(n-2)}$ position obtained from the reading result of the first reading element R1 should be the same value as the distance d, that is, the track pitch. However, in practice, the servo pattern usually has nonlinearity. A difference "$d-(Y(2)_n-Y(1)_{(n-1)})$" between d and "$Y(2)_n-Y(1)_{(n-1)}$" is expressed as "$e_{(n-1)}$". In addition, a difference "$d-(Y(2)_{(n-1)}-Y(1)_{(n-2)})$" between d and "$Y(2)_{(n-1)}-Y(1)_{(n-2)}$" is expressed as "$e_{(n-2)}$". An absolute value of the difference "$e_{(n-2)}-e_{(n-1)}$" is calculated as an indicator of the nonlinearity. A total of "n−1" absolute values are obtained, and an arithmetic average thereof is defined as the αPNL. Here, n=E described above is satisfied.

In the magnetic tape, the αPNL obtained by the method described above is 10.0% or less of the track pitch. That is, in a case where the track pitch is defined as "C", a value calculated by "(αPNL/C)×100" is 10.0% or less. The αPNL which is 10.0% or less of the track pitch can contribute to the improvement of the recording and reproducing quality in a case where the total number of data tracks is in the range described above. From a viewpoint of further improving the recording and reproducing quality, the αPNL is preferably 9.5% or less, more preferably 9.0% or less, and even more preferably in the order of 8.5% or less, 8.0% or less, 7.5% or less, 7.0% or less, 6.5% or less, 6.0% or less, 5.5% or less, and 5.0% or less of the track pitch. In addition, the αPNL can be, for example, 0.5% or more, 1.0% or more, 1.5% or more, or 2.0% or more of the track pitch. A numerical value of the αPNL is not limited as long as it is 10.0% or less of the track pitch. As an example, the αPNL can be in a range of, for example, 0.005 to 0.300 m. A method for controlling the αPNL will be described later.

<Formation of Servo Pattern>

A magnetic recording head which forms a servo pattern on a magnetic layer of a magnetic tape is called a servo write head. The servo write head normally includes a magnetic film including a write gap. The magnetic film can be a film having ferromagnetism, and is preferably a film having soft magnetism. The "write gap" included in the magnetic film of the servo write head is a magnetic interval which is an interval for generating a leakage magnetic field for forming a servo pattern which is a magnetized region. In order to form the servo pattern in which the αPNL is 10.0% or less of the track pitch, it is preferable that the write gap is formed on the magnetic film by ion beam processing. In the present invention and the present specification, the "ion beam processing" refers to a process of forming an opening portion by emitting an ion beam. The opening portion which penetrates from a recording surface side to a rear surface side of the magnetic film can be formed, for example by the ion beam processing. The "recording surface side" refers to a servo write head surface side facing the surface of the magnetic layer of the magnetic tape in a contact state or a contactless state in a case of forming the servo pattern, and a surface side opposite to the surface refers to the "rear surface side". The "surface of the magnetic layer" is identical to the surface of the magnetic tape on the magnetic layer side.

Figure 7:
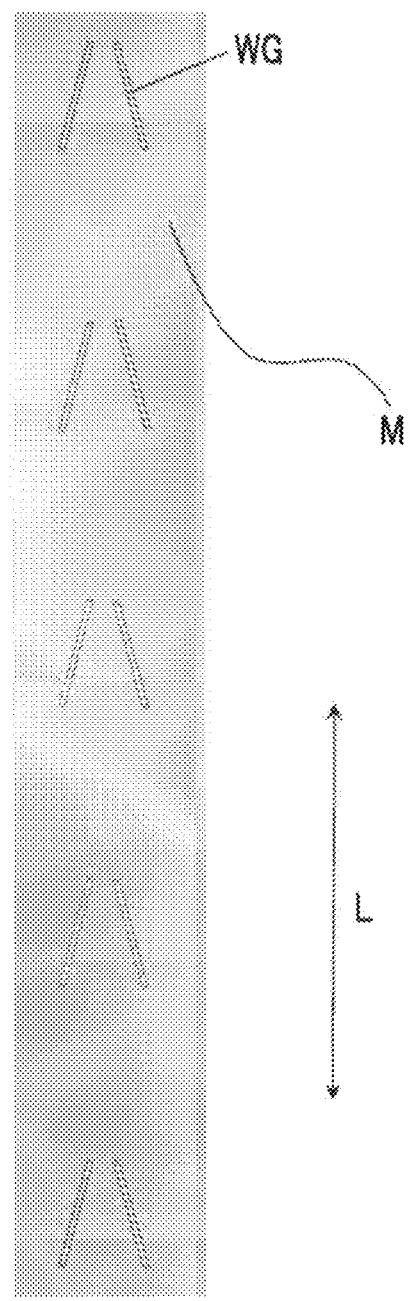
FIG. 7 shows an example of disposition of a write gap in a servo write head.

FIG. 7 shows an example of disposition of a write gap in a servo write head for forming a timing-based servo pattern. FIG. 7 is a schematic plan view of the magnetic film observed from the recording surface side of the servo write head, in which five pairs of "/Y" write gaps are provided in a longitudinal direction L. Accordingly, a total of 10 write gaps WG (white portions in the drawing) are provided on a magnetic film M of the servo write head. Each write gap is inclined with respect to the longitudinal direction at the same azimuth angle α as the servo pattern to be formed on the magnetic layer of the magnetic tape. In a case of forming the servo pattern, the servo pattern can be formed on each of five servo bands, for example, in the arrangement shown in FIG. 2, by applying a pulse current to a servo write head facing the surface of the magnetic layer of the magnetic tape in a contact state or a contactless state to generating a leakage magnetic field between the write gap at the position where a predetermined servo pattern is to be formed. For example, by applying the pulse current, the pair of servo patterns (the servo pattern A1 and the servo pattern B1) can be formed by the pair of write gaps of "/Y", and the servo pattern A2 and the servo pattern B2, the servo pattern A3 and the servo pattern B3, the servo pattern A4 and the servo pattern B4, the servo pattern A5 and the servo pattern B5, the servo pattern C1 and the servo pattern D1, the servo pattern C2 and the servo pattern D2, the servo pattern C3 and the servo pattern D3, and the servo pattern C4 and the servo pattern D4 can be sequentially formed. By repeating the formation of the servo pattern pair as described above, the plurality of servo frames SF can be sequentially formed in the longitudinal direction of the servo band of the magnetic layer of the magnetic tape.

(Example of Configuration of Servo Write Head)

Hereinafter, an example of a configuration of the servo write head will be described with reference to the drawings. However, the aspect shown in the drawings is an example, and the present invention is not limited to such an aspect.

The servo write head can be a ring-type magnetic recording head and can be an inductive head. The inductive head is also generally referred to as an electromagnetic induction type head or a magnetic induction type head. In the inductive head, a current is allowed to flow to a coil to generate a leakage magnetic field from a write gap of a head core, and this leakage magnetic field can form a magnetization region on the magnetic layer of the magnetic tape.

Figure 8:
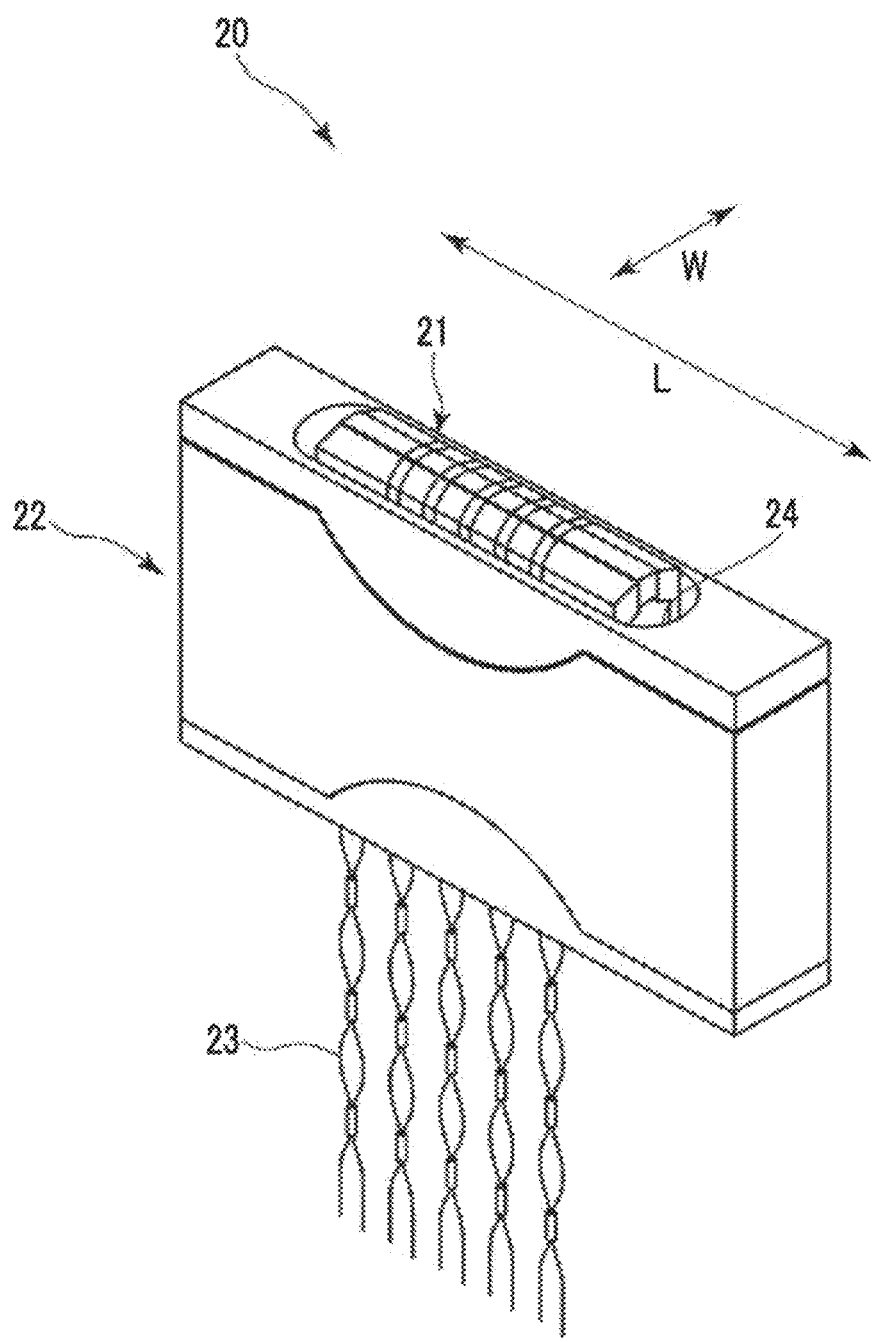
FIG. 8 is a perspective view showing an example of a servo write head.

FIG. 8 is a perspective view showing an example of the servo write head. FIG. 8 is a perspective view of a state where the servo write head is observed from the recording surface side. A servo write head 20 shown in FIG. 8 includes a head block 21, a shield case 22, and a coil 25 (see FIG. 9).

The shield case 22 is a case for shielding a magnetic field generated from the coil 25 (see FIG. 9) included in the servo write head 20 and/or shielding a magnetic field from another external component. The shield case 22 can be a case having a rectangular shape with a hollow inner portion, which is formed of a well-known material capable of shielding a magnetic field.

An opening 24 for exposing the head block 21 from the shield case 22 is provided on an upper portion of the shield case 22. In addition, an opening for drawing a conductive wire 23 connected to the coil 25 to the outside of the shield case 22 is provided on a lower portion of the shield case 22.

Figure 9:
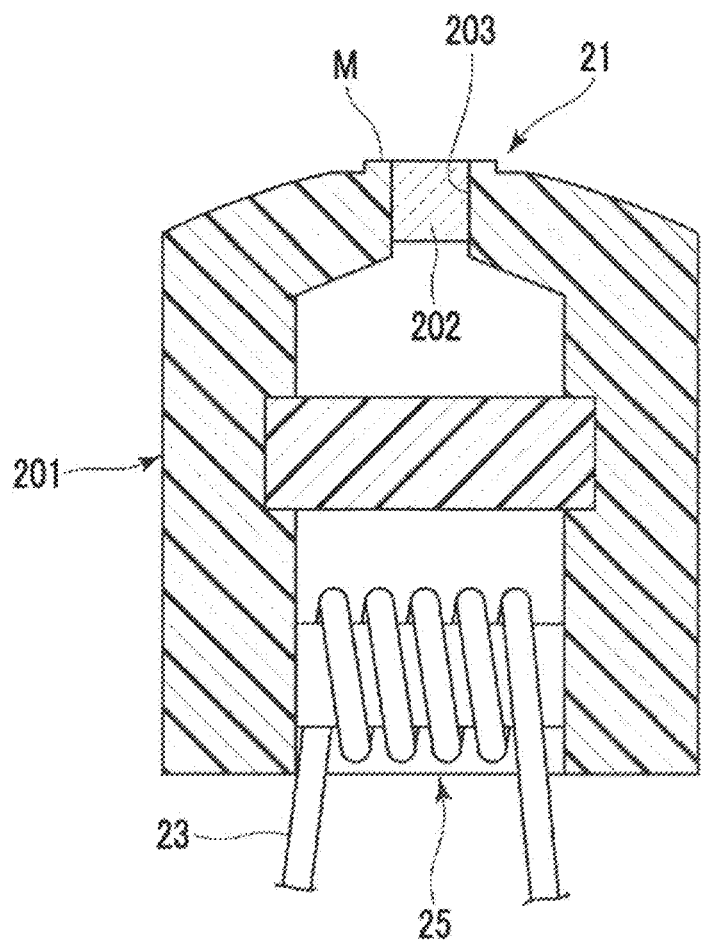
FIG. 9 is a cross-sectional view of a servo write head 20 shown in FIG. 8.

FIG. 9 is a cross-sectional view of the servo write head 20 shown in FIG. 8. The cross-sectional view shown in FIG. 9 is a cross-sectional view of the servo write head 20 in a width direction W which is a direction orthogonal to a longitudinal direction L.

The head block 21 includes a core portion 201 and a substrate 202 including the magnetic film M thereon. In a case where the core portion 201 is excited by the coil 25, the write gap of the magnetic film hinders a magnetic flux that tends to pass through the magnetic film.

Accordingly, a leakage magnetic field is generated at a position of the write gap. By this leakage magnetic field, it is possible to form a magnetization region on the magnetic layer of the magnetic tape, that is, to perform the recording.

As a material constituting the core portion 201, a magnetic material normally used for the core portion of a ring-type magnetic recording head can be used. Examples of the magnetic material include ferrites such as a single crystal ferrite and a polycrystalline ferrite, and examples of the ferrite include a manganese zinc-based ferrite. An opening 203 penetrating in the vertical direction along the longitudinal direction is formed in the vicinity of the center of an upper portion of the core portion 201 in the width direction. The substrate 202 is disposed in this opening 203 so as to fill this opening 203.

Examples of the material of the substrate 202 include non-magnetic materials (for example, various glass materials and various ceramic materials).

Figure 10:
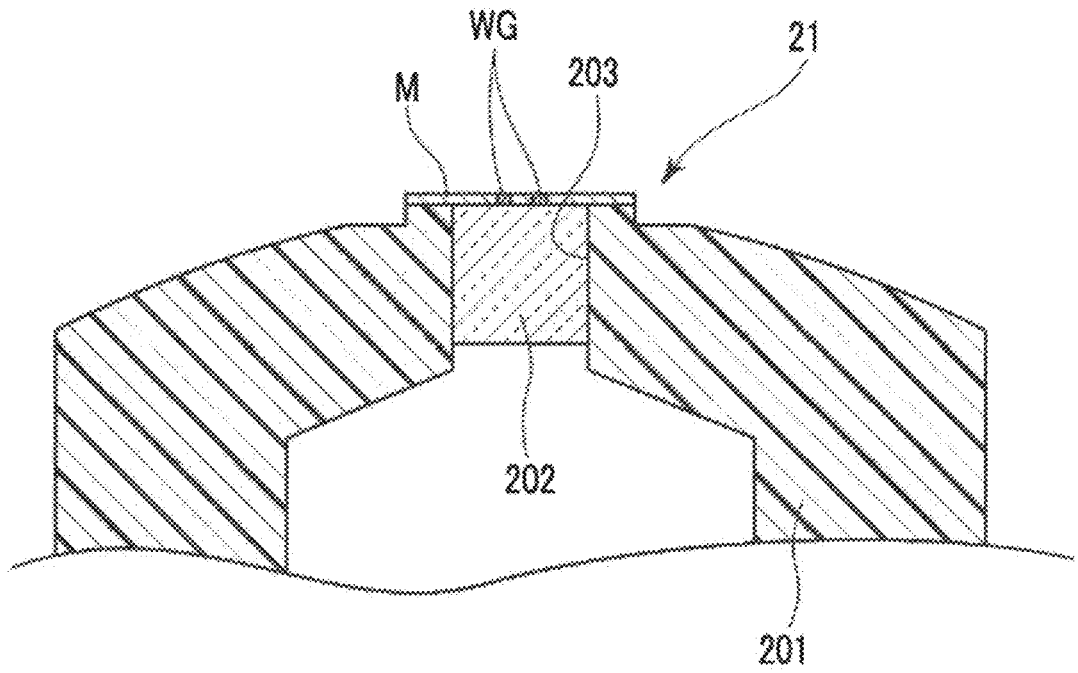
FIG. 10 is a partially enlarged view of the cross-sectional view of the servo write head 20 shown in FIG. 9.

FIG. 10 is a partially enlarged view of the cross-sectional view of the servo write head 20 shown in FIG. 9. The write gaps WG are provided in the magnetic film M provided on the substrate 202.

The magnetic film M can be a metal film. Here, the "metal film" includes an alloy film. The metal film can be a deposited film on which one or more kinds of metal materials selected from a group consisting of one or more kinds of pure metals and one or more kinds of alloys are deposited, can include one or more kinds of additives, and/or can include one or more kinds of impurities unavoidably mixed. The magnetic film M can be an iron-based alloy film. Here, the "-based" means "containing". The iron-based alloy film can be preferably an iron nitride-based alloy film. As the iron nitride-based alloy, Fe, N, and one kind or two or more kinds selected from a group consist of Al, Ta, and the like are used as constituent elements. The magnetic film can be a deposited film obtained by depositing a metal material on a substrate by a well-known film forming method such as physical vapor deposition (PVD) such as sputtering, vacuum evaporation, or the like and chemical vapor deposition (CVD).

The ion beam processing for forming the opening portion in the magnetic film can be performed by a well-known ion beam processing capable of forming the opening portion by emitting a processing target with an ion beam. The ion beam processing can be performed by processing generally called ion milling, and is preferably focused ion beam (FIB) processing from a viewpoint of processing accuracy or the like. The ion beam is a beam in which ions are accelerated by an electric field, and the focused ion beam is an ion beam in which an ion beam is focused by a lens or the like. The focused ion beam processing is also generally referred to as FIB processing. The focused ion beam processing can be performed by using a focused ion beam apparatus having a commercially available or well-known configuration. Processing conditions may be set according to a type, a film thickness, and the like of the material to be processed. For example, as a processing setting beam diameter in the ion beam processing such as the focused ion beam processing or the like is decreased, a value of the αPNL tends to be decreased.

The servo pattern included in the magnetic tape is a timing-based servo pattern. As shown in European Computer Manufacturers Association (ECMA)-319 (June 2001), a timing-based servo system is used in a magnetic tape based on a linear tape-open (LTO) standard (generally referred to as an "LTO tape"). In this timing-based servo system, the servo pattern is configured by continuously disposing a plurality of pairs of magnetic stripes (also referred to as "servo stripes") not parallel to each other in a longitudinal direction of the magnetic tape. As described above, a reason for that the servo pattern is configured with one pair of magnetic stripes not parallel to each other is because a servo pattern reading element passing on the servo pattern recognizes a passage position thereof. Specifically, one pair of the magnetic stripes are formed so that a gap thereof is continuously changed along the width direction of the magnetic tape, and a relative position of the servo pattern and the servo pattern reading element can be recognized, by the reading of the gap thereof by the servo pattern reading element. The information of this relative position can realize the tracking of a data track. Accordingly, a plurality of servo tracks are generally set on the servo pattern along the width direction of the magnetic tape.

The servo band is configured of servo patterns continuous in the longitudinal direction of the magnetic tape. A plurality of servo bands are normally provided on the magnetic tape. For example, the number thereof is 5 in the LTO tape. A region interposed between two adjacent servo bands is a data band. The data band is configured of a plurality of data tracks and each data track corresponds to each servo track.

In one aspect, as shown in JP2004-318983A, information showing the number of servo band (also referred to as "servo band identification (ID)" or "Unique Data Band Identification Method (UDIM) information") is embedded in each servo band. This servo band ID is recorded by shifting a specific servo stripe among the plurality of pairs of servo stripes in the servo band so that the position thereof is relatively deviated in the longitudinal direction of the magnetic tape. Specifically, the position of the shifted specific servo stripe among the plurality of pairs of servo stripes is changed for each servo band. Accordingly, the recorded servo band ID becomes unique for each servo band, and therefore, the servo band can be uniquely specified by only reading one servo band by the servo pattern reading element.

In a method for uniquely specifying the servo band, a staggered method as shown in ECMA-319 (June 2001) is used. In this staggered method, a plurality of the groups of one pair of magnetic stripes (servo stripe) not parallel to each other which are continuously disposed in the longitudinal direction of the magnetic tape is recorded so as to be shifted in the longitudinal direction of the magnetic tape for each servo band. A combination of this shifted servo band between the adjacent servo bands is set to be unique in the entire magnetic tape, and accordingly, the servo band can also be uniquely specified by reading of the servo pattern by two servo pattern reading elements.

In addition, as shown in ECMA-319 (June 2001), information showing the position in the longitudinal direction of the magnetic tape (also referred to as "Longitudinal Position (LPOS) information") is normally embedded in each servo band. This LPOS information is recorded so that the position of one pair of servo stripes is shifted in the longitudinal direction of the magnetic tape, in the same manner as the UDIM information. However, unlike the UDIM information, the same signal is recorded on each servo band in this LPOS information.

Other information different from the UDIM information and the LPOS information can be embedded in the servo band. In this case, the embedded information may be different for each servo band as the UDIM information, or may be common in all of the servo bands, as the LPOS information.

In addition, as a method for embedding the information in the servo band, a method other than the method described above can be used. For example, a predetermined code may be recorded by thinning out a predetermined pair among the group of pairs of the servo stripes.

Before forming the servo pattern on the magnetic tape, a demagnetization (erasing) process is generally performed on the magnetic tape. This erasing process can be performed by applying a uniform magnetic field to the magnetic tape by using a DC magnet and an AC magnet. The erasing process includes direct current (DC) erasing and alternating current (AC) erasing. The AC erasing is performed by slowly decreasing an intensity of the magnetic field, while reversing a direction of the magnetic field applied to the magnetic tape. Meanwhile, the DC erasing is performed by applying the magnetic field in one direction to the magnetic tape.

The DC erasing further includes two methods. A first method is horizontal DC erasing of applying the magnetic field in one direction along a longitudinal direction of the magnetic tape. A second method is vertical DC erasing of applying the magnetic field in one direction along a thickness direction of the magnetic tape. The erasing process may be performed with respect to all of the magnetic tape or may be performed for each servo band of the magnetic tape.

A direction of the magnetic field to the servo pattern to be formed is determined in accordance with the direction of erasing. For example, in a case where the horizontal DC erasing is performed to the magnetic tape, the formation of the servo pattern is performed so that the direction of the magnetic field and the direction of erasing is opposite to each other. Accordingly, the output of the servo signal obtained by the reading of the servo pattern can be increased. As disclosed in JP2012-53940A, in a case where the formation of the servo pattern using the write gap (can also be referred to as the formation of the magnetization region or the transfer of the magnetic pattern) is performed on the magnetic tape subjected to the vertical DC erasing, the servo signal obtained by the reading of the formed servo pattern has a unipolar pulse shape. Meanwhile, in a case where the magnetic pattern is formed to the magnetic tape subjected to the horizontal DC erasing by using the write gap, the servo signal obtained by the reading of the formed servo pattern has a bipolar pulse shape.

(Magnetic Tape on which Servo Pattern is Formed)

The magnetic tape is generally classified into a coating type and a metal thin film type. The magnetic tape on which the servo pattern is formed may be a coating type magnetic tape or may be a metal thin film type magnetic tape. The magnetic tape normally includes a non-magnetic support and a magnetic layer containing a ferromagnetic powder, can include a non-magnetic layer containing a non-magnetic powder between the non-magnetic support and the magnetic layer, and can also include a back coating layer containing a non-magnetic powder on a surface side of the non-magnetic support opposite to a surface side including the magnetic layer. In the coating type magnetic tape, the magnetic layer, the non-magnetic layer, and the back coating layer include a binder, and can optionally include one or more kinds of additives. The metal thin film type magnetic recording medium can include, for example, a magnetic layer formed by a sputtering method. For details of the magnetic tape, a well-known technology can be applied, and, for example, a description of paragraphs 0135 to 0201 of JP2020-126704A and examples thereof can be referred to. However, the present invention is not limited thereto, and a well-known technology can be applied for details of a component included in the magnetic tape, a layer configuration, and the like.

Examples of the ferromagnetic powder included in the magnetic layer of the magnetic tape include a hexagonal ferrite powder, an ε-iron oxide powder, and the like.

In the invention and the specification, the "hexagonal ferrite powder" is a ferromagnetic powder in which a hexagonal ferrite type crystal structure is detected as a main phase by X-ray diffraction analysis. The main phase is a structure to which a diffraction peak at the highest intensity in an X-ray diffraction spectrum obtained by the X-ray diffraction analysis belongs. For example, in a case where the diffraction peak at the highest intensity in the X-ray diffraction spectrum obtained by the X-ray diffraction analysis belongs to a hexagonal ferrite type crystal structure, it is determined that the hexagonal ferrite type crystal structure is detected as a main phase. In a case where only a single structure is detected by the X-ray diffraction analysis, this detected structure is set as a main phase. The hexagonal ferrite type crystal structure includes at least an iron atom, a divalent metal atom, and an oxygen atom as constituting atoms. A divalent metal atom is a metal atom which can be divalent cations as ions, and examples thereof include an alkali earth metal atom such as a strontium atom, a barium atom, or a calcium atom, and a lead atom. In the invention and the specification, the "hexagonal strontium ferrite powder" is powder in which a main divalent metal atom included in this powder is a strontium atom, and the "hexagonal barium ferrite powder" is a powder in which a main divalent metal atom included in this powder is a barium atom. The main divalent metal atom is a divalent metal atom occupying the greatest content in the divalent metal atom included in the powder based on atom %. However, the divalent metal atom described above does not include rare earth atom. The "rare earth atom" of the invention and the specification is selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

In the invention and the specification, the "ε-iron oxide powder" is a ferromagnetic powder in which an ε-iron oxide type crystal structure is detected as a main phase by X-ray diffraction analysis. For example, in a case where the diffraction peak at the highest intensity in the X-ray diffraction spectrum obtained by the X-ray diffraction analysis belongs to an ε-iron oxide type crystal structure, it is determined that the ε-iron oxide type crystal structure is detected as a main phase. The ε-iron oxide powder contains a substituted ε-iron oxide powder in which a part of Fe is substituted with substituted atoms such as Ga, Co, Ti, Al, and Rh, and an unsubstituted type ε-iron oxide powder that does not contain such substituted atoms.

(Example of Configuration of Servo Writer)

Figure 11:
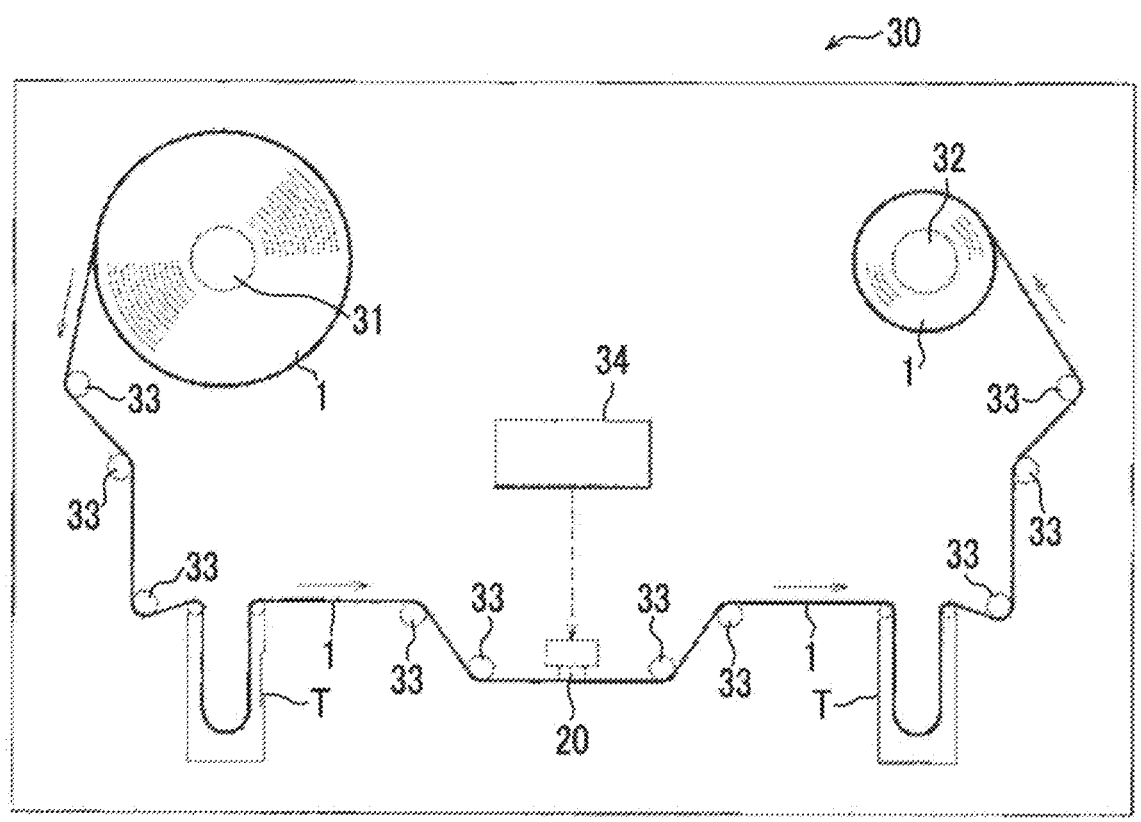
FIG. 11 is a schematic diagram showing a configuration of a servo writer.

A magnetic recording apparatus including a servo write head and forming a servo pattern on the magnetic layer of the magnetic tape by the servo write head is called a servo writer. FIG. 11 is a schematic diagram showing a configuration of a servo writer. A servo writer 30 shown in FIG. 11 includes a reel 31 which sends out a magnetic tape 1 before the servo pattern is formed, and a reel 32 which winds the magnetic tape 1 on which the servo pattern is formed. An arrow in FIG. 11 indicates a transport direction of the magnetic tape 1. A plurality of guides 33 and a tension adjustment device T for adjusting a tension of the magnetic tape 1 to be transported are disposed in a transport passage of the magnetic tape 1. The servo write head 20 forms a servo pattern on the magnetic layer of the magnetic tape 1 to be transported. A write signal generation circuit 34 transmits a pulse signal for forming a servo pattern to the servo write head 20. As a result, a leakage magnetic field is generated from the write gap WG of the servo write head 20, and the leakage magnetic field can form a magnetization region (the servo pattern) in the magnetic layer of the magnetic tape.

<Magnetic Tape Device>

In the invention and the specification, the "magnetic tape device" means a device capable of performing at least the recording of data on the magnetic tape and can also be a device capable of performing the reproducing of the data recorded on the magnetic tape. A device capable of recording the data on the magnetic tape and/or reproducing the recorded data is generally called a drive.

The magnetic tape device includes the magnetic tape and normally further includes a magnetic head. In the magnetic tape device, the recording of data on the magnetic tape and/or the reproducing of data recorded on the magnetic tape can be performed by bringing the surface of the magnetic layer of the magnetic tape into contact with the magnetic head and sliding.

The data recording in the magnetic tape device is performed with the total number of data tracks described above. The magnetic tape device can include a magnetic head including a recording element capable of recording data on the magnetic tape, and can include a reproducing element capable of reproducing the data recorded on the magnetic tape on a magnetic head which is the same as the magnetic head described above or a magnetic different therefrom. Many of the magnetic heads that have been widely used in recent years have a configuration in which both a recording element and a reproducing element are provided in one magnetic head. Examples of the recording element include a metal-in-gap (MIG) element and the like. As the reproducing element, a magnetoresistive (MR) element capable of reading data recorded on the magnetic tape with excellent sensitivity is preferable. As the MR element, various well-known MR elements (for example, a Giant Magnetoresistive (GMR) element, or a Tunnel Magnetoresistive (TMR) element) can be used. In addition, the magnetic head including the recording element and/or the reproducing element may include a servo pattern reading element (generally, also referred to as a "servo signal reading element"). Alternatively, as a head other than the magnetic head including the recording element and/or reproducing element, a magnetic head including the servo pattern reading element may be included in the magnetic tape device. The magnetic head including the servo pattern reading element is also generally referred to as a "servo head". For example, the magnetic head (hereinafter, also referred to as a "recording and reproducing head") including the recording element and/or the reproducing element can include two servo pattern reading elements, and each of the two servo pattern reading elements can read adjacent two servo bands with a data band interposed therebetween at the same time. One or a plurality of elements for data can be disposed between the two servo pattern reading elements. The element for recording data (recording element) and the element for reproducing data (reproducing element) are collectively referred to as "elements for data".

In a case of recording data and/or reproducing recorded data, first, head tracking using a reading result of the servo pattern can be performed. For example, as the servo pattern reading element follows a predetermined servo track, the element for data can be controlled to pass on the target data track. The movement of the data track can be performed by changing the servo track to be read by the servo pattern reading element in the tape width direction.

In addition, the recording and reproducing head can perform the recording and/or reproducing with respect to other data bands. In this case, the servo pattern reading element is moved to a predetermined servo band by using the UDIM information described above, and the tracking with respect to the servo band may be started.

For the recording and reproducing of the data on the magnetic tape, for example, a description of paragraphs 0033 to 0134 of JP2020-126704A and examples thereof can be referred to. However, there is no limitation thereto. For the recording of data on the magnetic tape in the magnetic tape device, a well-known technology related to the data recording on the magnetic tape can be applied in addition to the data recording with the total number of data tracks described above. In addition, for the data reproducing, a well-known technology related to the reproducing of the data recorded on the magnetic tape can be applied.

[Magnetic Tape Cartridge]

According to still another aspect of the invention, there is provided a magnetic tape cartridge comprising the magnetic tape described above.

The details of the magnetic tape included in the magnetic tape cartridge are as described above.

In the magnetic tape cartridge, the magnetic tape is generally accommodated in a cartridge main body in a state of being wound around a reel. The reel is rotatably provided in the cartridge main body. As the magnetic tape cartridge, a single reel type magnetic tape cartridge including one reel in a cartridge main body and a twin reel type magnetic tape cartridge including two reels in a cartridge main body are widely used. In a case where the single reel type magnetic tape cartridge is mounted in the magnetic tape device in order to record and/or reproduce data on the magnetic tape, the magnetic tape is drawn from the magnetic tape cartridge and wound around the reel on the magnetic tape device side. A magnetic head is disposed on a magnetic tape transportation path from the magnetic tape cartridge to a winding reel. Feeding and winding of the magnetic tape are performed between a reel (supply reel) on the magnetic tape cartridge side and a reel (winding reel) on the magnetic tape device side. In the meantime, for example, the magnetic head comes into contact with and slides on the surface of the magnetic layer of the magnetic tape, and accordingly, the recording and/or reproducing of data is performed. With respect to this, in the twin reel type magnetic tape cartridge, both reels of the supply reel and the winding reel are provided in the magnetic tape cartridge.

EXAMPLES

Hereinafter, the invention will be described with reference to examples. However, the invention is not limited to aspects shown in the examples. Unless otherwise specified, "parts" and "%" described below are based on mass. In addition, steps and evaluations described below are performed in an environment of an atmosphere temperature of 23° C.±1° C., unless otherwise noted. "eq" described below indicates equivalent and a unit not convertible into SI unit. Various physical property values of the various components described below are values measured by a method disclosed in JP2020-126704A. In addition, a recording element width and a reproducing element width in Table 1 are physical dimensions of the element width, respectively, and are values measured by observing with an optical microscope, a scanning electron microscope, or the like.

Example 1

<Manufacturing of Magnetic Tape>
<<Magnetic Layer Forming Composition>>
(Magnetic Liquid)
  Ferromagnetic powder (type: hexagonal barium ferrite powder, activated volume: 1600 nm$^3$): 100.0 parts
  Oleic acid: 2.0 parts
  Vinyl chloride copolymer (MR-104 manufactured by Kaneka Corporation): 10.0 parts SO$_3$Na group-containing polyurethane resin: 4.0 parts
  (Weight-average molecular weight: 70,000, SO$_3$Na group: 0.07 meq/g)
  Additive A: 10.0 parts
  Methyl ethyl ketone: 150.0 parts
  Cyclohexanone: 150.0 parts
(Abrasive Solution)
  α-alumina (Average particle size: 110 nm): 6.0 parts
  Vinyl chloride copolymer (MR 110 manufactured by Kaneka Corporation): 0.7 parts
  Cyclohexanone: 20.0 parts
(Projection Formation Agent Liquid)
  Projection formation agent: 1.3 parts
  Methyl ethyl ketone: 9.0 parts
  Cyclohexanone: 6.0 parts
(Lubricant and Curing Agent Liquid)
  Stearic acid: 3.0 parts
  Stearic acid amide: 0.3 parts
  Butyl stearate: 6.0 parts
  Methyl ethyl ketone: 110.0 parts
  Cyclohexanone: 110.0 parts
  Polyisocyanate (CORONATE (registered product) L manufactured by Tosoh Corporation): 3.0 parts The additive A described above is a polymer synthesized by the method disclosed in paragraphs 0115 to 0123 of JP2016-051493A.

The projection formation agent is ATLAS (composite particles of silica and polymer, average particle size: 100 nm) manufactured by Cabot Corporation.
<<Non-Magnetic Layer Forming Composition>>
  Non-magnetic inorganic powder (a-iron oxide): 80.0 parts
  (Average particle size: 0.15 μm, average acicular ratio: 7, Brunauer-Emmett-Teller (BET) specific surface area: 52 m$^2$/g)
  Carbon black (average particle size: 20 nm): 20.0 parts
  Electron beam curable vinyl chloride copolymer: 13.0 parts
  Electron beam curable polyurethane resin: 6.0 parts
  Phenylphosphonic acid: 3.0 parts
  Cyclohexanone: 140.0 parts
  Methyl ethyl ketone: 170.0 parts
  Butyl stearate: 2.0 parts
  Stearic acid: 1.0 part
<<Back Coating Layer Forming Composition>>
  Non-magnetic inorganic powder (α-iron oxide): 80.0 parts
  (Average particle size: 0.15 μm, average acicular ratio: 7, BET specific surface area: 52 m$^2$/g)
  Carbon black (average particle size: 20 nm): 20.0 parts
  Carbon black (average particle size: 100 nm): 3.0 parts
  Vinyl chloride copolymer: 13.0 parts
  Sulfonic acid group-containing polyurethane resin: 6.0 parts
  Phenylphosphonic acid: 3.0 parts
  Cyclohexanone: 140.0 parts
  Methyl ethyl ketone: 170.0 parts
  Stearic acid: 3.0 parts
  Polyisocyanate (CORONATE (registered product) manufactured by Tosoh Corporation): 5.0 parts
  Methyl ethyl ketone: 400.0 parts
<<Preparation of Each Layer Forming Composition>>

The magnetic layer forming composition was prepared by the following method.

The components of the magnetic liquid were kneaded by an open kneader and diluted, and was subjected to a dispersion process of 12 passes, with a transverse beads mill disperser and zirconia (ZrO$_2$) beads having a particle diameter of 0.5 mm (hereinafter, referred to as "Zr beads"), by setting a bead filling percentage as 80 volume %, a circumferential speed of rotor distal end as 10 m/sec, and a retention time for 1 pass for 2 minutes.

After mixing components of the abrasive solution described above, this was put into a vertical sand mill disperser together with Zr beads having a particle diameter of 1 mm, a proportion of a bead volume with respect to a total of an abrasive solution volume and a bead volume was adjusted to 60%, and the sand mill dispersion process was performed for 180 minutes. The liquid after the sand mill dispersion process was taken out and subjected to the ultrasonic dispersion filtration treatment using a flow type ultrasonic dispersion filtering device to prepare an abrasive solution.

The magnetic liquid, the abrasive solution, the projection formation agent liquid, the lubricant, and the curing agent liquid were introduced in a dissolver stirrer, and stirred at a circumferential speed of 10 m/see for 30 minutes. Then, a process at a flow rate of 7.5 kg/min was performed for 3 passes with a flow type ultrasonic disperser, and then, the mixture was filtered with a filter having a hole diameter of 1 m, to prepare a magnetic layer forming composition.

The non-magnetic layer forming composition was prepared by the following method.

The components excluding the lubricant (butyl stearate and stearic acid) were kneaded and diluted with an open kneader, and then dispersed with a transverse beads mill disperser. Then, the lubricant (butyl stearate and stearic acid) was added, and the mixture was stirred and mixed with a dissolver stirrer to prepare a non-magnetic layer forming composition.

The back coating layer forming composition was prepared by the following method.

The components excluding the lubricant (stearic acid), polyisocyanate, and methyl ethyl ketone (400.0 parts) were kneaded and diluted with an open kneader, and then dispersed with a transverse beads mill disperser. Then, the lubricant (stearic acid), polyisocyanate, and methyl ethyl ketone (400.0 parts) were added, and the mixture was stirred and mixed with a dissolver stirrer to prepare a back coating layer forming composition.

<<Manufacturing of Magnetic Tape, Formation of Servo Pattern>>

The non-magnetic layer forming composition was applied to a biaxial stretching support made of polyethylene naphthalate having a thickness of 6.0 m so that the thickness after the drying is 1.0 m and was dried to emit an electron ray to have energy of 40 kGy at an acceleration voltage of 125 kV. The magnetic layer forming composition was applied onto that so that the thickness after the drying is 50 nm and dried, and the back coating layer forming composition was applied to a surface of the support opposite to the surface where the non-magnetic layer and the magnetic layer are formed, so that the thickness after the drying is 0.5 µm and dried.

Then, a calender process was performed by using a 7-stage calender roll configured of only a metal roll, at a calendar speed of 80 m/min, linear pressure of 294 kN/m, and a calender temperature (surface temperature of a calender roll) of 80° C. Then, the heat treatment was performed in the environment of the atmosphere temperature of 70° C. for 36 hours. After heat treatment, the slitting was performed so as to have a width of ½ inches, and the surface of the magnetic layer was cleaned with a tape cleaning device in which a nonwoven fabric and a razor blade are attached to a device including a sending and winding devices of the slit product to press the surface of the magnetic layer, and the magnetic tape was obtained.

In a state where the magnetic layer of the obtained magnetic tape was demagnetized, servo patterns (timing-based servo patterns) having disposition and shapes according to the LTO Ultrium format of the example shown in FIG. 2 were formed on the magnetic layer by using a servo write head mounted on a servo writer. Accordingly, a magnetic tape of Example 1 including data bands, servo bands, and guard bands in the disposition according to the LTO Ultrium format in the magnetic layer, and including servo patterns having the disposition and the shape according to the LTO Ultrium format on the servo band was obtained. As the servo writer, a servo writer having the configuration shown in FIG. 11 was used. A servo write head mounted on this servo writer includes a write gap which includes an opening portion formed by the FIB processing under the processing conditions described below and has a shape corresponding to a servo pattern having an azimuth angle, a pattern height, a midpoint distance, and a sub-frame length shown in Table 1.

(Processing Conditions)
  Focused ion beam device: FB-2200 manufactured by Hitachi High-Technologies Corporation
  Acceleration voltage: 30 kV
  Focusing lens: Provided
  Aperture diameter: 80 µm
  Dwell Time (irradiation time per pixel): 5 µsec
  Processing set beam diameter: 1.0 µm For Example 1, two rolls of magnetic tape were manufactured by the same method, one was used for a recording and reproducing test and the other one was used for other measurements.

<Recording and Reproducing Test>

Electromagnetic upstream characteristics of the magnetic tape were measured by the following method using a ½ inch reel tester including a head tracking control mechanism disclosed in paragraphs 0080 to 0086 of JP2020-126704A.

A running speed of the magnetic tape (a relative speed between the magnetic head and the magnetic tape) was 2 m/sec. A signal was recorded with a linear recording density of 325 kfci. In addition, the unit kfci is a unit of linear recording density (not convertible to SI unit system). The "number of recording and reproducing elements" in Table 1 is the number of channels including each one of the recording element and the reproducing element. A Metal-In-Gap (MIG) element (gap length: 0.15 µm, recording element width: see Table 1) was used as the recording element, and a recording current was set to the optimum recording current of each magnetic tape. As a recording method, a shingled magnetic recording method was used. The shingled magnetic recording method is also called a shingled magnetic recording method in Japanese. The shingled magnetic recording method is a method capable of forming a data track with a track pitch narrower than the recording element width and recording data so that adjacent tracks overlap each other. As the reproducing element, a Tunnel Magneto-Resistive (TMR) element having an element thickness of 15 nm, a shield interval of 0.1 µm, and a reproducing element width shown in Table 1 was used. A reproducing signal was measured with a spectrum analyzer manufactured by Shiba-Soku Co., Ltd. A ratio of an output value of a carrier signal to an integrated noise in the entire spectrum band was defined as a Signal-to-Noise Ratio (SNR). Regarding the SNR, an SNR in a case where simultaneous recording and reproducing (recording with a recording element of a downstream module and immediately reproducing with a reproducing element of an upstream module) which is a method different from the shingled magnetic recording method is performed before performing the shingled magnetic recording method, is set as 0 dB. In a case where an SNR in a case where a track with a narrowed width is reproduced later by the shingled magnetic recording method is within −3.00 dB with respect to an SNR in a case where the simultaneous recording and reproducing is performed, it can be determined that an excellent reproducing signal is obtained, that is, the improvement of the recording and reproducing quality is achieved.

A total number of data tracks in the shingled magnetic recording was calculated by the following equation. As the "number of recording elements" in the equation, a value of the "number of recording and reproducing elements" in Table 1 was used.

Total number of data tracks=number of data bands× number of wraps in 1 data band×number of recording elements The track pitch of the magnetic tape after the shingled magnetic recording was determined by the method described above. Dimension 3100 manufactured by Bruker was used in a frequency modulation mode as a magnetic force microscope and SSS-MFMR (nominal curvature radius of 15 nm) manufactured by Nanoworld was used as a probe. During the observation with a magnetic force microscope, a measurement pitch was set as 100 nm, and a distance between the surface of the magnetic layer and a distal end of the probe was set as 20 nm.

<Measurement of Azimuth Angle, Pattern Height, Midpoint Distance, and Sub-Frame Length of Servo Pattern>

For one servo frame randomly specified from among a plurality of servo frames included in the magnetic tape of Example 1, various values regarding the shape of the servo pattern were obtained by the method described above.

Specifically, in the magnetic tape of Example 1, one randomly specified servo frame was magnetically developed. The magnetic development was performed using a colloidal solution for observing a magnetic pattern (for example, Sigmarker Q manufactured by Sigma High Chemical Inc.). Various values regarding the shape of the magnetically developed servo pattern can be obtained by measuring a length with a microscope having a length measuring function in an X/Y direction (MM-800 manufactured by Nikon Corporation; minimum resolution of the length measurement is 1 m). The number of times of measurements for obtaining each value was 5 and each value shown in Table 1 was obtained as an arithmetic average of the values obtained by the 5 measurements.

<αPNL>

The αPNL was obtained by the method described above with reference to FIGS. 6A and 6B. Here, d=track pitch. Table 1 shows measured values and values for the track pitch for the αPNL. As the reading elements R1 and R2, a TMR element having an element width of 2 μm or less was used.

Example 2

A magnetic tape was manufactured and the recording and reproducing test and various measurements were performed in the same manner as in Example 1, except that the processing set beam diameter is decreased in the processing conditions of the FIB processing when manufacturing the servo write head.

Comparative Example 1

A magnetic tape was manufactured and the recording and reproducing test and various measurements were performed in the same manner as in Example 1, except that a servo write head in which an opening portion with a write gap is formed by micro electromechanical system (MEMS) processing was used as the servo write head.

Comparative Example 2

A magnetic tape was manufactured and the recording and reproducing test and various measurements were performed in the same manner as in Example 1, except that a servo write head in which an opening portion with a write gap is formed by the MEMS processing under processing conditions different from those in Comparative Example 1 was used as the servo write head.

Example 3

A magnetic tape was manufactured and the recording and reproducing test and various measurements were performed in the same manner as in Example 1, except that items shown in Table 1 were changed as shown in Table 1.

Example 4

A magnetic tape was manufactured and the recording and reproducing test and various measurements were performed in the same manner as in Example 3, except that the processing set beam diameter is decreased in the processing conditions of the FIB processing when manufacturing the servo write head.

Example 5

A magnetic tape was manufactured and the recording and reproducing test and various measurements were performed in the same manner as in Example 3, except that the processing set beam diameter is decreased in the processing conditions of the FIB processing when manufacturing the servo write head.

Comparative Example 3

A magnetic tape was manufactured and the recording and reproducing test and various measurements were performed in the same manner as in Example 3, except that a servo write head in which an opening portion with a write gap is formed by the MEMS processing under the processing conditions was used as the servo write head.

Example 6

A magnetic tape was manufactured and the recording and reproducing test and various measurements were performed in the same manner as in Example 1, except that items shown in Table 1 were changed as shown in Table 1.

Example 7

A magnetic tape was manufactured and the recording and reproducing test and various measurements were performed in the same manner as in Example 6, except that the processing set beam diameter is decreased in the processing conditions of the FIB processing when manufacturing the servo write head.

Example 8

A magnetic tape was manufactured and the recording and reproducing test and various measurements were performed in the same manner as in Example 6, except that the processing set beam diameter is decreased in the processing conditions of the FIB processing when manufacturing the servo write head.

Comparative Example 4

A magnetic tape was manufactured and the recording and reproducing test and various measurements were performed in the same manner as in Example 6, except that a servo write head in which an opening portion with a write gap is formed by the MEMS processing under the processing conditions was used as the servo write head.

Example 9

A magnetic tape was manufactured and the recording and reproducing test and various measurements were performed in the same manner as in Example 1, except that items shown in Table 1 were changed as shown in Table 1.

Example 10

A magnetic tape was manufactured and the recording and reproducing test and various measurements were performed in the same manner as in Example 9, except that the processing set beam diameter is decreased in the processing conditions of the FIB processing when manufacturing the servo write head.

Comparative Example 5

A magnetic tape was manufactured and the recording and reproducing test and various measurements were performed in the same manner as in Example 9, except that a servo write head in which an opening portion with a write gap is formed by the MEMS processing under the processing conditions was used as the servo write head.

Example 11

A magnetic tape was manufactured and the recording and reproducing test and various measurements were performed in the same manner as in Example 1, except that items shown in Table 1 were changed as shown in Table 1.

Example 12

A magnetic tape was manufactured and the recording and reproducing test and various measurements were performed in the same manner as in Example 11, except that the processing set beam diameter is decreased in the processing conditions of the FIB processing when manufacturing the servo write head.

Comparative Example 6

A magnetic tape was manufactured and the recording and reproducing test and various measurements were performed in the same manner as in Example 11, except that a servo write head in which an opening portion with a write gap is formed by the MEMS processing under the processing conditions was used as the servo write head.

Example 13

A magnetic tape was manufactured and the recording and reproducing test and various measurements were performed in the same manner as in Example 1, except that items shown in Table 1 were changed as shown in Table 1.

Example 14

A magnetic tape was manufactured and the recording and reproducing test and various measurements were performed in the same manner as in Example 13, except that the processing set beam diameter is decreased in the processing conditions of the FIB processing when manufacturing the servo write head.

Comparative Example 7

A magnetic tape was manufactured and the recording and reproducing test and various measurements were performed in the same manner as in Example 13, except that a servo write head in which an opening portion with a write gap is formed by the MEMS processing under the processing conditions was used as the servo write head.

Example 15

A magnetic tape was manufactured and the recording and reproducing test and various measurements were performed in the same manner as in Example 1, except that items shown in Table 1 were changed as shown in Table 1.

Comparative Example 8

A magnetic tape was manufactured and the recording and reproducing test and various measurements were performed in the same manner as in Example 15, except that a servo write head in which an opening portion with a write gap is formed by the MEMS processing under the processing conditions was used as the servo write head.

Example 16

A magnetic tape was manufactured and the recording and reproducing test and various measurements were performed in the same manner as in Example 1, except that items shown in Table 1 were changed as shown in Table 1.

Example 17

A magnetic tape was manufactured and the recording and reproducing test and various measurements were performed in the same manner as in Example 16, except that the processing set beam diameter is decreased in the processing conditions of the FIB processing when manufacturing the servo write head.

Comparative Example 9

A magnetic tape was manufactured and the recording and reproducing test and various measurements were performed in the same manner as in Example 16, except that a servo write head in which an opening portion with a write gap is formed by the MEMS processing under the processing conditions was used as the servo write head.

Example 18

A magnetic tape was manufactured and the recording and reproducing test and various measurements were performed in the same manner as in Example 1, except that items shown in Table 1 were changed as shown in Table 1.

Example 19

A magnetic tape was manufactured and the recording and reproducing test and various measurements were performed in the same manner as in Example 18, except that the processing set beam diameter is decreased in the processing conditions of the FIB processing when manufacturing the servo write head.

Comparative Example 10

A magnetic tape was manufactured and the recording and reproducing test and various measurements were performed in the same manner as in Example 18, except that a servo write head in which an opening portion with a write gap is formed by the MEMS processing under the processing conditions was used as the servo write head.

Reference Example 1

A magnetic tape was manufactured and the recording and reproducing test and various measurements were performed in the same manner as in Example 1, except that items shown in Table 1 were changed as shown in Table 1.

Reference Example 2

A magnetic tape was manufactured and the recording and reproducing test and various measurements were performed in the same manner as in Reference Example 1, except that a servo write head in which an opening portion with a write gap is formed by the MEMS processing under the processing conditions was used as the servo write head.

Reference Example 3

A magnetic tape was manufactured and the recording and reproducing test and various measurements were performed in the same manner as in Reference Example 2, except that items shown in Table 1 were changed as shown in Table 1.

Reference Example 4 and Reference Example 6

A magnetic tape was manufactured and the recording and reproducing test and various measurements were performed in the same manner as in Example 1, except that items shown in Table 1 were changed as shown in Table 1.

Reference Example 5

A magnetic tape was manufactured and the recording and reproducing test and various measurements were performed in the same manner as in Reference Example 4, except that items shown in Table 1 were changed as shown in Table 1.

The result described above is shown in Table 1 (Tables 1-1 to 1-4).

TABLE 1-1

|  | Unit | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Number of data bands | — | 4 | 4 | 8 | 8 | 8 | 8 | 8 | 8 | 4 | 4 |
| Number of wraps in 1 data band | — | 70 | 70 | 36 | 36 | 36 | 36 | 36 | 36 | 102 | 102 |
| Number of recording and reproducing elements | — | 32 | 32 | 32 | 32 | 32 | 32 | 32 | 32 | 32 | 32 |
| Total number of data tracks | — | 8960 | 8960 | 9216 | 9216 | 9216 | 9216 | 9216 | 9216 | 13056 | 13056 |
| Recording element width | μm | 1.57 | 1.57 | 1.57 | 1.57 | 1.57 | 1.57 | 1.57 | 1.57 | 1.07 | 1.07 |
| Track pitch | μm | 1.18 | 1.18 | 1.18 | 1.18 | 1.18 | 1.18 | 1.18 | 1.18 | 0.80 | 0.80 |
| Reproducing element width | μm | 0.71 | 0.71 | 0.71 | 0.71 | 0.71 | 0.71 | 0.71 | 0.71 | 0.48 | 0.48 |
| Azimuth angle | ° | 12 | 12 | 18 | 18 | 18 | 24 | 24 | 24 | 12 | 12 |
| Pattern height | μm | 96 | 96 | 48 | 48 | 48 | 48 | 48 | 48 | 96 | 96 |
| Midpoint distance | μm | 38 | 38 | 28 | 28 | 28 | 34 | 34 | 34 | 38 | 38 |
| Sub-frame length | μm | 76 | 76 | 56 | 56 | 56 | 68 | 68 | 68 | 76 | 76 |
| ΔPNL | μm | 0.115 | 0.070 | 0.110 | 0.075 | 0.035 | 0.110 | 0.070 | 0.015 | 0.070 | 0.035 |
|  | % | 9.7% | 5.9% | 9.3% | 6.4% | 3.0% | 9.3% | 5.9% | 1.3% | 8.8% | 4.4% |
| SNR | dB | −2.93 | −1.50 | −2.51 | −1.76 | −0.23 | −2.69 | −1.68 | 0.08 | −2.59 | −1.13 |

TABLE 1-2

|  | Unit | Example 11 | Example 12 | Example 13 | Example 14 | Example 15 | Example 16 | Example 17 | Example 18 | Example 19 |
|---|---|---|---|---|---|---|---|---|---|---|
| Number of data bands | — | 8 | 8 | 8 | 8 | 4 | 8 | 8 | 8 | 8 |
| Number of wraps in 1 data band | — | 52 | 52 | 52 | 52 | 204 | 102 | 102 | 102 | 102 |
| Number of recording and reproducing elements | — | 32 | 32 | 32 | 32 | 32 | 32 | 32 | 32 | 32 |
| Total number of data tracks | — | 13312 | 13312 | 13312 | 13312 | 26112 | 26112 | 26112 | 26112 | 26112 |
| Recording element width | μm | 1.07 | 1.07 | 1.07 | 1.07 | 0.53 | 0.53 | 0.53 | 0.53 | 0.53 |
| Track pitch | μm | 0.80 | 0.80 | 0.80 | 0.80 | 0.40 | 0.40 | 0.40 | 0.40 | 0.40 |
| Reproducing element width | μm | 0.48 | 0.48 | 0.48 | 0.48 | 0.24 | 0.24 | 0.24 | 0.24 | 0.24 |
| Azimuth angle | ° | 18 | 18 | 24 | 24 | 12 | 18 | 18 | 24 | 24 |
| Pattern height | μm | 48 | 48 | 48 | 48 | 96 | 48 | 48 | 48 | 48 |
| Midpoint distance | μm | 28 | 28 | 34 | 34 | 38 | 28 | 28 | 34 | 34 |
| Sub-frame length | μm | 56 | 56 | 68 | 68 | 76 | 56 | 56 | 68 | 68 |
| ΔPNL | μm | 0.075 | 0.035 | 0.070 | 0.015 | 0.035 | 0.035 | 0.025 | 0.035 | 0.015 |
|  | % | 9.4% | 4.4% | 8.8% | 1.9% | 8.8% | 8.8% | 6.3% | 8.8% | 3.8% |
| SNR | dB | −2.95 | −0.91 | −3.00 | −0.15 | −2.53 | −2.96 | −1.87 | −2.57 | −0.92 |

TABLE 1-3

|  | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|
| Number of data bands | — | 4 | 4 | 8 | 8 | 4 | 8 | 8 | 4 | 8 | 8 |
| Number of wraps in 1 data band | — | 70 | 70 | 36 | 36 | 102 | 52 | 52 | 204 | 102 | 102 |
| Number of recording and reproducing elements | — | 32 | 32 | 32 | 32 | 32 | 3.2 | 32 | 32 | 32 | 32 |

TABLE 1-3-continued

| | Unit | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|
| Total number of data tracks | — | 8960 | 8960 | 9216 | 9216 | 13056 | 13312 | 13312 | 26112 | 26112 | 26112 |
| Recording element width | μm | 1.57 | 1.57 | 1.57 | 1.57 | 1.07 | 1.07 | 1.07 | 0.53 | 0.53 | 0.53 |
| Track pitch | μm | 1.18 | 1.18 | 1.18 | 1.18 | 0.80 | 0.80 | 0.80 | 0.40 | 0.40 | 0.40 |
| Reproducing element width | μm | 0.71 | 0.71 | 0.71 | 0.71 | 0.48 | 0.48 | 0.48 | 0.24 | 0.24 | 0.24 |
| Azimuth angle | ° | 12 | 12 | 18 | 24 | 12 | 18 | 24 | 12 | 18 | 24 |
| Pattern height | μm | 96 | 96 | 48 | 48 | 96 | 48 | 48 | 96 | 48 | 48 |
| Midpoint distance | μm | 38 | 38 | 28 | 34 | 38 | 28 | 34 | 38 | 28 | 34 |
| Sub-frame length | μm | 76 | 76 | 56 | 68 | 76 | 56 | 68 | 76 | 56 | 68 |
| ΔPNT | μm | 0.140 | 0.180 | 0.150 | 0.130 | 0.115 | 0.110 | 0.110 | 0.070 | 0.075 | 0.070 |
| | % | 11.9% | 15.3% | 12.7% | 11.0% | 14.4% | 13.8% | 13.8% | 17.5% | 18.8% | 17.5% |
| SNR | dB | −4.10 | −6.07 | −4.51 | −3.80 | −5.00 | −4.82 | −4.74 | −7.08 | −7.58 | −7.30 |

TABLE 1-4

| | Unit | Reference Example 1 | Reference Example 2 | Reference Example 3 | Reference Example 4 | Reference Example 5 | Reference Example 6 |
|---|---|---|---|---|---|---|---|
| Number of data bands | — | 4 | 4 | 8 | 4 | 4 | 8 |
| Number of wraps in 1 data band | — | 52 | 52 | 26 | 40 | 40 | 20 |
| Number of recording and reproducing elements | — | 32 | 32 | 32 | 32 | 32 | 32 |
| Total number of data tracks | — | 6656 | 6656 | 6656 | 5120 | 5120 | 5120 |
| Recording element width | μm | 2.13 | 2.13 | 2.13 | 2.67 | 2.67 | 2.67 |
| Track pitch | μm | 1.60 | 1.60 | 1.60 | 2.00 | 2.00 | 2.00 |
| Reproducing element width | μm | 0.96 | 0.96 | 0.96 | 1.20 | 1.20 | 1.20 |
| Azimuth angle | ° | 12 | 12 | 18 | 12 | 12 | 18 |
| Pattern height | μm | 96 | 96 | 48 | 96 | 96 | 48 |
| Midpoint distance | μm | 38 | 38 | 28 | 38 | 38 | 28 |
| Sub-frame length | μm | 76 | 76 | 56 | 76 | 76 | 56 |
| ΔPNL | μm | 0.140 | 0.180 | 0.180 | 0.140 | 0.240 | 0.180 |
| | % | 8.8% | 11.3% | 11.3% | 7.0% | 12.0% | 9.0% |
| SNR | dB | 0.10 | −0.05 | −0.04 | 0.01 | −0.03 | 0.02 |

From the results of Examples, Comparative Examples, and Reference Examples shown in Table 1, it can be found that, in a case where the total number of data tracks is 8705 or more (in conversion of the magnetic tape having a width of ½ inches), the αPNL of the timing-based servo pattern which is 10.0% or less of the track pitch (see Examples 1 to 19) leads to the improvement of the recording and reproducing quality.

One aspect of the invention is advantageous for various data storages.

What is claimed is:

1. A magnetic tape comprising:
a timing-based servo pattern,
ΔPNL of the timing-based servo pattern is 10.0% or less of a track pitch, and
the ΔPNL indicates an amount of deviation of the timing-based servo pattern from linearity.

2. The magnetic tape according to claim 1, wherein an azimuth angle of the timing-based servo pattern is 5° or more.

3. The magnetic tape according to claim 1, wherein an azimuth angle of the timing-based servo pattern is 18° or more.

4. The magnetic tape according to claim 1, wherein an azimuth angle of the timing-based servo pattern is 24° or more.

5. The magnetic tape according to claim 1, wherein the ΔPNL of the timing-based servo pattern is 0.5% to 10.0% of the track pitch.

6. The magnetic tape according to claim 1, further comprising:
a non-magnetic support; and
a magnetic layer.

7. The magnetic tape according to claim 6, further comprising:
a non-magnetic layer between the non-magnetic support and the magnetic layer.

8. The magnetic tape according to claim 6, further comprising:
a back coating layer on a surface side of the non-magnetic support opposite to a surface side including the magnetic layer.

9. A magnetic tape cartridge comprising:
the magnetic tape according to claim 1.

10. A magnetic tape device comprising:
a magnetic tape,
wherein the magnetic tape includes a timing-based servo pattern,
ΔPNL of the timing-based servo pattern is 10.0% or less of a track pitch, and
the ΔPNL indicates an amount of deviation of the timing-based servo pattern from linearity.

11. The magnetic tape device according to claim 10, wherein an azimuth angle of the timing-based servo pattern is 5° or more.

12. The magnetic tape device according to claim 10, wherein an azimuth angle of the timing-based servo pattern is 18° or more.

13. The magnetic tape device according to claim 10, wherein an azimuth angle of the timing-based servo pattern is 24° or more.

14. The magnetic tape device according to claim 10, wherein the ΔPNL of the timing-based servo pattern is 0.5% to 10.0% of the track pitch.

15. The magnetic tape device according to claim 10, wherein the magnetic tape includes a non-magnetic support and a magnetic layer.

16. The magnetic tape device according to claim 15, wherein the magnetic tape further includes a non-magnetic layer between the non-magnetic support and the magnetic layer.

17. The magnetic tape device according to claim 15, wherein the magnetic tape further includes a back coating layer on a surface side of the non-magnetic support opposite to a surface side including the magnetic layer.

\* \* \* \* \*